US012395289B2

(12) United States Patent
Takeda et al.

(10) Patent No.: US 12,395,289 B2
(45) Date of Patent: Aug. 19, 2025

(54) REFERENCE SIGNAL CONFIGURATION FOR SECONDARY CELL ACTIVATION

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US); Juan Montojo, San Diego, CA (US); Wanshi Chen, San Diego, CA (US); Tao Luo, San Diego, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 548 days.

(21) Appl. No.: 17/507,049

(22) Filed: Oct. 21, 2021

(65) Prior Publication Data

US 2022/0131669 A1     Apr. 28, 2022

Related U.S. Application Data

(60) Provisional application No. 63/094,996, filed on Oct. 22, 2020.

(51) Int. Cl.
*H04W 56/00*      (2009.01)
*H04L 5/00*       (2006.01)
(Continued)

(52) U.S. Cl.
CPC ........... *H04L 5/0048* (2013.01); *H04W 24/08* (2013.01); *H04W 72/23* (2023.01)

(58) Field of Classification Search
CPC ........ H04L 5/0048; H04L 72/23; H04L 24/08
(Continued)

(56) References Cited

U.S. PATENT DOCUMENTS 11,456,830 B2   9/2022  Lee et al.
2011/0268087 A1  11/2011 Kwon et al.
(Continued)

FOREIGN PATENT DOCUMENTS

CN    110149178 A    8/2019
CN    111385078 A    7/2020
(Continued)

OTHER PUBLICATIONS

"Li, A Signalling Processing, Sending Method, Device And Storage Medium, Nov. 13, 2020, CN 111934837" (Year: 2020).*
(Continued)

*Primary Examiner* — Yemane Mesfin
(74) *Attorney, Agent, or Firm* — Holland & Hart LLP

(57) ABSTRACT

Methods, systems, and devices for wireless communications are described, in which temporary reference signals may be configured for use in secondary cell (SCell) activation. A user equipment (UE) may perform wireless communications with a first serving cell supported by a base station, and may receive an indication that a SCell is to be activated. As a result of activation of the SCell, the UE may perform one or more measurements on a reference signal of the SCell that is being activated. The one or more measurements may be performed on a temporary reference signal of the SCell that has one or more parameters that are indicated to the UE with the SCell activation information. The one or more parameter may be indicated by downlink control information (DCI), one or more medium access control (MAC) control elements, implicit signaling, or any combinations thereof.

16 Claims, 27 Drawing Sheets

(51) Int. Cl.
*H04W 24/08* (2009.01)
*H04W 72/23* (2023.01)

(58) Field of Classification Search
USPC .......................................................... 370/252
See application file for complete search history.

(56) References Cited

U.S. PATENT DOCUMENTS

| | | | |
|---|---|---|---|
| 2019/0207662 A1* | 7/2019 | Zhou | H04W 72/0446 |
| 2019/0215136 A1 | 7/2019 | Zhou et al. | |
| 2019/0356444 A1 | 11/2019 | Noh et al. | |
| 2021/0377876 A1* | 12/2021 | Jeon | H04W 24/08 |
| 2024/0155595 A1* | 5/2024 | Cirik | H04W 72/046 |

FOREIGN PATENT DOCUMENTS

| | | | |
|---|---|---|---|
| EP | 3897046 A1 | 10/2021 | |
| JP | 2019159296 A | 9/2019 | |
| WO | 2019139769 A1 | 7/2019 | |
| WO | 2020034889 A1 | 2/2020 | |
| WO | WO-2020135341 A1 | 7/2020 | |

OTHER PUBLICATIONS

"Zhang et al., Communication Method and Apparatus for Activating Secondary Cell, Apr. 1, 2021, WO 2021056334" (Year: 2019).*
International Search Report and Written Opinion—PCT/US2021/056234—ISA/EPO—Apr. 4, 2022.
Vivo: "Discussion on Efficient Activation/De-Activation Mechanism for Scells", 3GPP TSG-RAN WG1 meeting #102-e, 3GPP Draft, R1-2005411, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, 10 Pages, Aug. 8, 2020 (Aug. 8, 2020), XP051917436, Retrieved from the Internet: URL: https://ftp.3gpp.org/tsg_ran/WG1_RL1/TSGR1_102-e/Docs/R1-2005411.zip R1-2005411 Discussion on efficient activationde-activation mechanism for Scells.docx [retrieved on Aug. 8, 2020] Sections 1-3.
CATT: "Discussion on Efficient Activation and De-Activation Mechanism for SCell in NR CA", 3GPP Draft, R1-2005698, Vol. RAN WG1, No. e-Meeting, Aug. 17, 2020-Aug. 28, 2020, Aug. 8, 2020 (Aug. 8, 2020), XP051917673, Retrieved from the Internet: URL:https://ftp.3gpp.org/tsg_ran/WG1_RL1/TSGR1_102-e/Docs/R1-2005698.zip R1-2005698.docx [retrieved on Aug. 8, 2020] Sections 1-3.
Partial International Search Report—PCT/US2021/056234—ISA/EPO—Feb. 10, 2022.
VIVO: "Discussion on Efficient Activation/de-activation Mechanism for Scells", R1-2005411, 3GPP TSG-RAN WG1 Meeting #102-e e-Meeting, August 17-28, Aug. 8, 2020, 10 Pages.
Mediatek Inc: "Efficient and Low Latency SCell Data Transmission for NR CA", 3GPP TSG RAN WG1 Meeting RAN1 #99, R1-1912101, Reno, U.S.A., Nov. 18-22, 2019, XP051823194, 15 pages.
Qualcomm Incorporated: "Discussion on fast SCell Activation Based on Aperiodic TRS (A-TRS)", R2-1914381, 3GPP TSG RAN WG2 Meeting #108 Reno, Nevada, US, Nov. 18-22, 2019, Nov. 8, 2019, pp. 1-7.

* cited by examiner

| C7 | C6 | C5 | C4 | C3 | C2 | C1 | R |
|---|---|---|---|---|---|---|---|
| C15 | C14 | C13 | C12 | C11 | C10 | C9 | C8 |
| ... | | | | | | | |

} Scell Activation Field — 910

905

| T1,7 | T1,6 | T1,5 | T1,4 | T1,3 | T1,2 | T1,1 | T1,0 |
|---|---|---|---|---|---|---|---|
| T2,7 | T2,6 | T2,5 | T2,4 | T2,3 | T2,2 | T2,1 | T2,0 |
| ... | | | | | | | |

} TRS Triggering Field — 915

920

| T1,7 | T1,6 | T1,5 | T1,4 | T1,3 | T1,2 | T1,1 | T1,0 |
|---|---|---|---|---|---|---|---|
| T2,7 | T2,6 | T2,5 | T2,4 | T2,3 | T2,2 | T2,1 | T2,0 |
| ... | | | | | | | |

} TRS Triggering Field — 925

930

| C7 | C6 | C5 | C4 | C3 | C2 | C1 | R |
|---|---|---|---|---|---|---|---|
| C15 | C14 | C13 | C12 | C11 | C10 | C9 | C8 |
| ... | | | | | | | |

} Carrier Indication Field — 935

| T1,7 | T1,6 | T1,5 | T1,4 | T1,3 | T1,2 | T1,1 | T1,0 |
|---|---|---|---|---|---|---|---|
| T2,7 | T2,6 | T2,5 | T2,4 | T2,3 | T2,2 | T2,1 | T2,0 |
| ... | | | | | | | |

} TRS Triggering Field — 940

REFERENCE SIGNAL CONFIGURATION FOR SECONDARY CELL ACTIVATION

CROSS REFERENCE

The present application for patent claims the benefit of U.S. Provisional Patent Application No. 63/094,996 by TAKEDA et al., entitled "REFERENCE SIGNAL CONFIGURATION FOR SECONDARY CELL ACTIVATION," filed Oct. 22, 2020, assigned to the assignee hereof, and expressly incorporated by reference herein.

TECHNICAL FIELD

The following relates to wireless communications, including reference signal configuration for secondary cell activation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, the base station may communicate with a UE via one or more serving cells, such as a primary cell (PCell) and one or more secondary cells (SCells). A base station may activate additional serving cells (e.g., SCells) at the UE to increase data throughput, to alleviate network congestion, or both. Conversely, the network may also deactivate serving cells which were previously activated. Efficient techniques for activating serving cells may help enhance the efficiency and reliability of a wireless communications system.

SUMMARY

The described techniques relate to improved methods, systems, devices, and apparatuses that support reference signal configuration for secondary cell activation. Various described techniques are directed to the use of reference signals (e.g., temporary reference signals, which may be referred to as aperiodic reference signals herein) on serving cells which are transmitted in order to decrease a time duration for activation of a serving cells at a user equipment (UE). In some aspects, a UE may perform wireless communications with a first serving cell supported by a base station (e.g., a primary cell (PCell)), and may receive an indication that a secondary cell (SCell) supported by the base station (or a different base station) is to be activated. As a result of activation of the SCell, the UE may perform one or more measurements on a reference signal of the SCell that is being activated, in order to perform automatic gain control (AGC), time tracking, frequency tracking, or any combinations thereof, for the SCell. In order to shorten the activation time for the SCell, a temporary reference signal may be transmitted on the SCell in advance of one or more other reference signals transmitted by the SCell (e.g., a reference signal transmitted with a synchronization signal block (SSB) that may have a relatively long periodicity). By receiving the temporary reference signal, the activation time for the SCell may be reduced, allowing for data communications relatively quickly after SCell activation.

In some cases, the SCell activation message may indicate one or more parameters for the temporary reference signal, such as a carrier for the temporary reference signal, a slot location of the temporary reference signal, a reference signal configuration, a beam configuration for the temporary signal, or any combinations thereof. In some cases, a downlink control information (DCI) communication from the base station that activates the SCell may provide the one or more parameters for the temporary reference signal. In other cases, a medium access control (MAC) control element (CE) may provide the one or more parameters for the temporary reference signal. Additionally or alternatively, one or more parameters for the temporary reference signal may implicitly signaled by the base station.

A method of wireless communication at a UE is described. The method may include receiving, from a base station, a secondary cell activation message that indicates a secondary cell is to be activated at the UE in addition to a primary cell, identifying, based on the secondary cell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and measuring one or more characteristics of the secondary cell based on the aperiodic reference signal.

An apparatus for wireless communication at a UE is described. The apparatus may include a processor, memory coupled (e.g., operatively, communicatively, functionally, electronically, and/or electrically) with the processor, and instructions stored in the memory. The instructions may be executable by the processor to cause the apparatus to receive, from a base station, a secondary cell activation message that indicates a secondary cell is to be activated at the UE in addition to a primary cell, identify, based on the secondary cell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and measure one or more characteristics of the secondary cell based on the aperiodic reference signal.

Another apparatus for wireless communication at a UE is described. The apparatus may include means for receiving, from a base station, a secondary cell activation message that indicates a secondary cell is to be activated at the UE in addition to a primary cell, identifying, based on the secondary cell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and measuring one or more characteristics of the secondary cell based on the aperiodic reference signal.

A non-transitory computer-readable medium storing code for wireless communication at a UE is described. The code may include instructions executable by a processor to receive, from a base station, a secondary cell activation message that indicates a secondary cell is to be activated at the UE in addition to a primary cell, identify, based on the secondary cell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and measure one or more characteristics of the secondary cell based on the aperiodic reference signal.

In some examples of the method, apparatuses, and non-transitory computer-readable medium described herein, the identifying may include operations, features, means, or instructions for receiving, from the base station, one or more of DCI or a MAC-CE that includes information associated with the aperiodic reference signal, and determining, based on the DCI, the MAC-CE, implicit signaling, or combinations thereof, the one or more parameters for the aperiodic reference signal. In some examples of the method, apparatuses, and non-transitory computer-readable medium described herein, the one or more parameters for the aperiodic reference signal include one or more of the carrier for the aperiodic reference signal, the slot location of the aperiodic reference signal, a mapping of resources of the aperiodic reference signal, a power offset of the aperiodic reference signal relative to a downlink shared channel or SSB transmission, a quasi-co-location (QCL) assumption for a beam of the aperiodic reference signal, a transmission configuration indicator (TCI) state of the aperiodic reference signal, or any combinations thereof.

In some examples of the method, apparatuses, and non-transitory computer-readable medium described herein, the aperiodic reference signal may be transmitted after a time gap associated with the secondary cell activation message. In some examples of the method, apparatuses, and non-transitory computer-readable medium described herein, the time gap corresponds to a first predetermined time period after an acknowledgment of the secondary cell activation message by the UE, a second predetermined time period after a downlink control channel communication that provides the DCI, or a third predetermined time period after an acknowledgment of the DCI by the UE.

Some examples of the method, apparatuses, and non-transitory computer-readable medium described herein may further include operations, features, means, or instructions for receiving, from the base station, DCI that indicates the one or more parameters for the aperiodic reference signal. In some examples of the method, apparatuses, and non-transitory computer-readable medium described herein, the DCI schedules a shared channel communication that provides the secondary cell activation message and indicates the one or more parameters for the aperiodic reference signal. In some examples of the method, apparatuses, and non-transitory computer-readable medium described herein, the one or more parameters for the aperiodic reference signal may be provided in an information field in the DCI, and where the information field may have a same format as a channel state information (CSI) request field that may be transmitted in DCI.

In some examples of the method, apparatuses, and non-transitory computer-readable medium described herein, the DCI may be a separate DCI from a scheduling DCI that schedules a shared channel communication that provides the secondary cell activation message. In some examples of the method, apparatuses, and non-transitory computer-readable medium described herein, the separate DCI includes other scheduling information for downlink shared channel communications with the UE, and the one or more parameters for the aperiodic reference signal. In some examples of the method, apparatuses, and non-transitory computer-readable medium described herein, the separate DCI may be included with a downlink control channel communication that does not provide scheduling information for shared channel communications. In some examples of the method, apparatuses, and non-transitory computer-readable medium described herein, the one or more parameters for the aperiodic reference signal may be provided in one or more fields in the separate DCI that may be otherwise used for the scheduling information for shared channel communications.

In some examples of the method, apparatuses, and non-transitory computer-readable medium described herein, the one or more parameters for the aperiodic reference signal may be provided in an information field having a same format as a CSI request field in an uplink grant. In some examples of the method, apparatuses, and non-transitory computer-readable medium described herein, a number of bits in the information field may be configured by radio resource control (RRC) signaling or may be determined based on a number of available tracking reference signal (TRS) states. In some examples of the method, apparatuses, and non-transitory computer-readable medium described herein, the information field may be mapped to one or more of a TRS timing or slot, a TRS resource, a TRS power offset, or any combinations thereof, for one or multiple serving cells. In some examples of the method, apparatuses, and non-transitory computer-readable medium described herein, the one or more parameters for the aperiodic reference signal may be provided in one or more of a frequency domain resource assignment (FDRA) field, a time domain resource assignment (TDRA) field, or any combinations thereof. In some examples of the method, apparatuses, and non-transitory computer-readable medium described herein, the DCI may have a fallback DCI format or a non-fallback DCI format.

In some examples of the method, apparatuses, and non-transitory computer-readable medium described herein, the DCI indicates that the UE is not to measure the aperiodic reference signal, and where the measuring of the one or more characteristics the secondary cell may be based on one or more channel measurements of a SSB associated with the secondary cell.

Some examples of the method, apparatuses, and non-transitory computer-readable medium described herein, measurements of the aperiodic reference signal may be triggered by the DCI having a preconfigured DCI format. In some examples of the method, apparatuses, and non-transitory computer-readable medium described herein, the preconfigured DCI format may be configured by RRC signaling.

Some examples of the method, apparatuses, and non-transitory computer-readable medium described herein measurements of the aperiodic reference signal may be triggered by the DCI located in a preconfigured DCI search space set. In some examples of the method, apparatuses, and non-transitory computer-readable medium described herein, one or more preconfigured DCI search space sets that can contain DCI that triggers measurement of the aperiodic reference signal may be configured by RRC signaling.

Some examples of the method, apparatuses, and non-transitory computer-readable medium described herein may further include operations, features, means, or instructions for receiving, from the base station, a MAC-CE that indicates the one or more parameters for the aperiodic reference signal. In some examples of the method, apparatuses, and non-transitory computer-readable medium described herein, the MAC-CE that provides the one or more parameters for the aperiodic reference signal also provides the secondary cell activation message. In some examples of the method, apparatuses, and non-transitory computer-readable medium described herein, a first MAC-CE provides the one or more parameters for the aperiodic reference signal and a second MAC-CE provides the secondary cell activation message. In some examples of the method, apparatuses, and non-transitory computer-readable medium described herein, the first MAC-CE and the second MAC-CE may be in a same downlink shared channel communication, or may be in different downlink shared channel communications, from the base station.

In some examples of the method, apparatuses, and non-transitory computer-readable medium described herein, the MAC-CE includes a first field that indicates the secondary cell that is to be activated and a second field that indicates the one or more parameters for the aperiodic reference signal for the secondary cell that is to be activated. In some examples of the method, apparatuses, and non-transitory computer-readable medium described herein, the MAC-CE includes a field that carries an indication of the one or more parameters for the aperiodic reference signal for two or more secondary cells. In some examples of the method, apparatuses, and non-transitory computer-readable medium described herein, the MAC-CE includes a first field that indicates a carrier of the aperiodic reference signal, and a second field that indicates one or more other parameters for the aperiodic reference signal.

Some examples of the method, apparatuses, and non-transitory computer-readable medium described herein may further include operations, features, means, or instructions for receiving, subsequent to receiving the MAC-CE, a DCI transmission from the base station that disables the aperiodic reference signal. In some examples of the method, apparatuses, and non-transitory computer-readable medium described herein, the aperiodic reference signal is enabled if a shared channel communication carrying the MAC-CE is scheduled by a preconfigured DCI format. In some examples of the method, apparatuses, and non-transitory computer-readable medium described herein, the preconfigured DCI format may be configured by RRC signaling. In some examples of the method, apparatuses, and non-transitory computer-readable medium described herein, the aperiodic reference signal is enabled if a shared channel communication carrying the MAC-CE is scheduled by a DCI transmission in a DCI search space set that is configured by RRC signaling.

In some examples of the method, apparatuses, and non-transitory computer-readable medium described herein, the one or more parameters for the aperiodic reference signal may be implicitly indicated by a MAC-CE that carries the secondary cell activation message. In some examples of the method, apparatuses, and non-transitory computer-readable medium described herein, the one or more parameters for the aperiodic reference signal may be preconfigured at the UE by higher layer signaling.

A method of wireless communication at a base station is described. The method may include transmitting, to a UE, a secondary cell activation message that indicates a secondary cell is to be activated at the UE in addition to a primary cell, identifying, based on the secondary cell activation message, one or more parameters for an aperiodic reference signal of the secondary cell, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and transmitting the aperiodic reference signal to the UE based on the identifying.

An apparatus for wireless communication at a base station is described. The apparatus may include a processor, memory coupled (e.g., operatively, communicatively, functionally, electronically, and/or electrically) with the processor, and instructions stored in the memory. The instructions may be executable by the processor to cause the apparatus to transmit, to a UE, a secondary cell activation message that indicates a secondary cell is to be activated at the UE in addition to a primary cell, identify, based on the secondary cell activation message, one or more parameters for an aperiodic reference signal of the secondary cell, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and transmit the aperiodic reference signal to the UE based on the identifying.

Another apparatus for wireless communication at a base station is described. The apparatus may include means for transmitting, to a UE, a secondary cell activation message that indicates a secondary cell is to be activated at the UE in addition to a primary cell, identifying, based on the secondary cell activation message, one or more parameters for an aperiodic reference signal of the secondary cell, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and transmitting the aperiodic reference signal to the UE based on the identifying.

A non-transitory computer-readable medium storing code for wireless communication at a base station is described. The code may include instructions executable by a processor to transmit, to a UE, a secondary cell activation message that indicates a secondary cell is to be activated at the UE in addition to a primary cell, identify, based on the secondary cell activation message, one or more parameters for an aperiodic reference signal of the secondary cell, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and transmit the aperiodic reference signal to the UE based on the identifying.

Some examples of the method, apparatuses, and non-transitory computer-readable medium described herein may further include operations, features, means, or instructions for transmitting, to the UE, one or more of DCI or a MAC-CE that includes information associated with the aperiodic reference signal, and where the one or more parameters for the aperiodic reference signal may be indicated by the DCI, the MAC-CE, an implicit indication, or any combinations thereof. In some examples of the method, apparatuses, and non-transitory computer-readable medium described herein, the one or more parameters for the aperiodic reference signal include one or more of the carrier for the aperiodic reference signal, the slot location of the aperiodic reference signal, a mapping of resources of the aperiodic reference signal, a power offset of the aperiodic reference signal relative to a downlink shared channel or SSB transmission, a QCL assumption for a beam of the aperiodic reference signal, a TCI state of the aperiodic reference signal, or any combinations thereof.

In some examples of the method, apparatuses, and non-transitory computer-readable medium described herein, the aperiodic reference signal may be transmitted after a time gap associated with the secondary cell activation message. In some examples of the method, apparatuses, and non-transitory computer-readable medium described herein, the time gap corresponds to a first predetermined time period after an acknowledgment of the secondary cell activation message by the UE, a second predetermined time period after a downlink control channel communication that provides the DCI, or a third predetermined time period after an acknowledgment of the DCI by the UE.

Some examples of the method, apparatuses, and non-transitory computer-readable medium described herein may further include operations, features, means, or instructions for transmitting, to the UE, DCI that indicates the one or more parameters for the aperiodic reference signal. In some examples of the method, apparatuses, and non-transitory computer-readable medium described herein, the DCI schedules a shared channel communication that provides the secondary cell activation message and indicates the one or more parameters for the aperiodic reference signal.

In some examples of the method, apparatuses, and non-transitory computer-readable medium described herein, the one or more parameters for the aperiodic reference signal may be provided in an information field in the DCI, and where the information field may have a same format as a CSI request field that may be transmitted in DCI. In some examples of the method, apparatuses, and non-transitory computer-readable medium described herein, the DCI may be a separate DCI from a scheduling DCI that schedules a shared channel communication that provides the secondary cell activation message. In some examples of the method, apparatuses, and non-transitory computer-readable medium described herein, the separate DCI includes other scheduling information for downlink shared channel communications with the UE, and the one or more parameters for the aperiodic reference signal. In some examples of the method, apparatuses, and non-transitory computer-readable medium described herein, the separate DCI may be included with a downlink control channel communication that does not provide scheduling information for shared channel communications. In some examples of the method, apparatuses, and non-transitory computer-readable medium described herein, the one or more parameters for the aperiodic reference signal may be provided in one or more fields in the separate DCI that may be otherwise used for the scheduling information for shared channel communications.

In some examples of the method, apparatuses, and non-transitory computer-readable medium described herein, the one or more parameters for the aperiodic reference signal may be provided in an information field having a same format as a CSI request field in an uplink grant. In some examples of the method, apparatuses, and non-transitory computer-readable medium described herein, a number of bits in the information field may be configured by RRC signaling or may be determined based on a number of available TRS states. In some examples of the method, apparatuses, and non-transitory computer-readable medium described herein, the information field may be mapped to one or more of a TRS timing or slot, a TRS resource, a TRS power offset, or any combinations thereof, for one or multiple serving cells. In some examples of the method, apparatuses, and non-transitory computer-readable medium described herein, the one or more parameters for the aperiodic reference signal may be provided in one or more of a FDRA field, a TDRA field, or any combinations thereof. In some examples of the method, apparatuses, and non-transitory computer-readable medium described herein, the DCI may have a fallback DCI format or a non-fallback DCI format.

In some examples of the method, apparatuses, and non-transitory computer-readable medium described herein, the DCI indicates that the UE is not to measure the aperiodic reference signal, and where the UE measures one or more characteristics of the secondary cell based on one or more channel measurements of a SSB associated with the secondary cell.

Some examples of the method, apparatuses, and non-transitory computer-readable medium described herein measurements of the aperiodic reference signal is triggered by the DCI having a preconfigured DCI format. In some examples of the method, apparatuses, and non-transitory computer-readable medium described herein, the preconfigured DCI format may be configured by RRC signaling.

Some examples of the method, apparatuses, and non-transitory computer-readable medium described herein measurements of the aperiodic reference signal is triggered by the DCI located in a preconfigured DCI search space set. In some examples of the method, apparatuses, and non-transitory computer-readable medium described herein, one or more preconfigured DCI search space sets that can contain DCI that triggers measurement of the aperiodic reference signal may be configured by RRC signaling.

Some examples of the method, apparatuses, and non-transitory computer-readable medium described herein may further include operations, features, means, or instructions for transmitting, to the UE, a MAC-CE that indicates the one or more parameters for the aperiodic reference signal. In some examples of the method, apparatuses, and non-transitory computer-readable medium described herein, the MAC-CE that provides the one or more parameters for the aperiodic reference signal also provides the secondary cell activation message. In some examples of the method, apparatuses, and non-transitory computer-readable medium described herein, a first MAC-CE provides the one or more parameters for the aperiodic reference signal and a second MAC-CE provides the secondary cell activation message. In some examples of the method, apparatuses, and non-transitory computer-readable medium described herein, the first MAC-CE and the second MAC-CE may be in a same downlink shared channel communication, or may be in different downlink shared channel communications, from the base station.

In some examples of the method, apparatuses, and non-transitory computer-readable medium described herein, the MAC-CE includes a first field that indicates the secondary cell that is to be activated and a second field that indicates the one or more parameters for the aperiodic reference signal for the secondary cell that is to be activated. In some examples of the method, apparatuses, and non-transitory computer-readable medium described herein, the MAC-CE includes a field that carries an indication of the one or more parameters for the aperiodic reference signal for two or more secondary cells. In some examples of the method, apparatuses, and non-transitory computer-readable medium described herein, the MAC-CE includes a first field that indicates a carrier of the aperiodic reference signal, and a second field that indicates one or more other parameters for the aperiodic reference signal.

Some examples of the method, apparatuses, and non-transitory computer-readable medium described herein may further include operations, features, means, or instructions for transmitting, subsequent to transmitting the MAC-CE, a DCI transmission to the UE that disables the aperiodic reference signal. In some examples of the method, apparatuses, and non-transitory computer-readable medium described herein, the aperiodic reference signal is enabled if a shared channel communication carrying the MAC-CE is scheduled by a preconfigured DCI format. In some examples of the method, apparatuses, and non-transitory computer-readable medium described herein, the preconfigured DCI format may be configured by RRC signaling. In some examples of the method, apparatuses, and non-transitory computer-readable medium described herein, the aperiodic reference signal is enabled if a shared channel communication carrying the MAC-CE is scheduled by a DCI transmission in a DCI search space set that is configured by RRC signaling.

In some examples of the method, apparatuses, and non-transitory computer-readable medium described herein, the one or more parameters for the aperiodic reference signal may be implicitly indicated by a MAC-CE that carries the secondary cell activation message. In some examples of the method, apparatuses, and non-transitory computer-readable medium described herein, the one or more parameters for the aperiodic reference signal may be preconfigured at the UE by higher layer signaling.

BRIEF DESCRIPTION OF THE DRAWINGS

FIG. 9 illustrates examples of reference signal activation fields that support reference signal configuration for secondary cell activation in accordance with aspects of the present disclosure.

DETAILED DESCRIPTION

Figure 1:
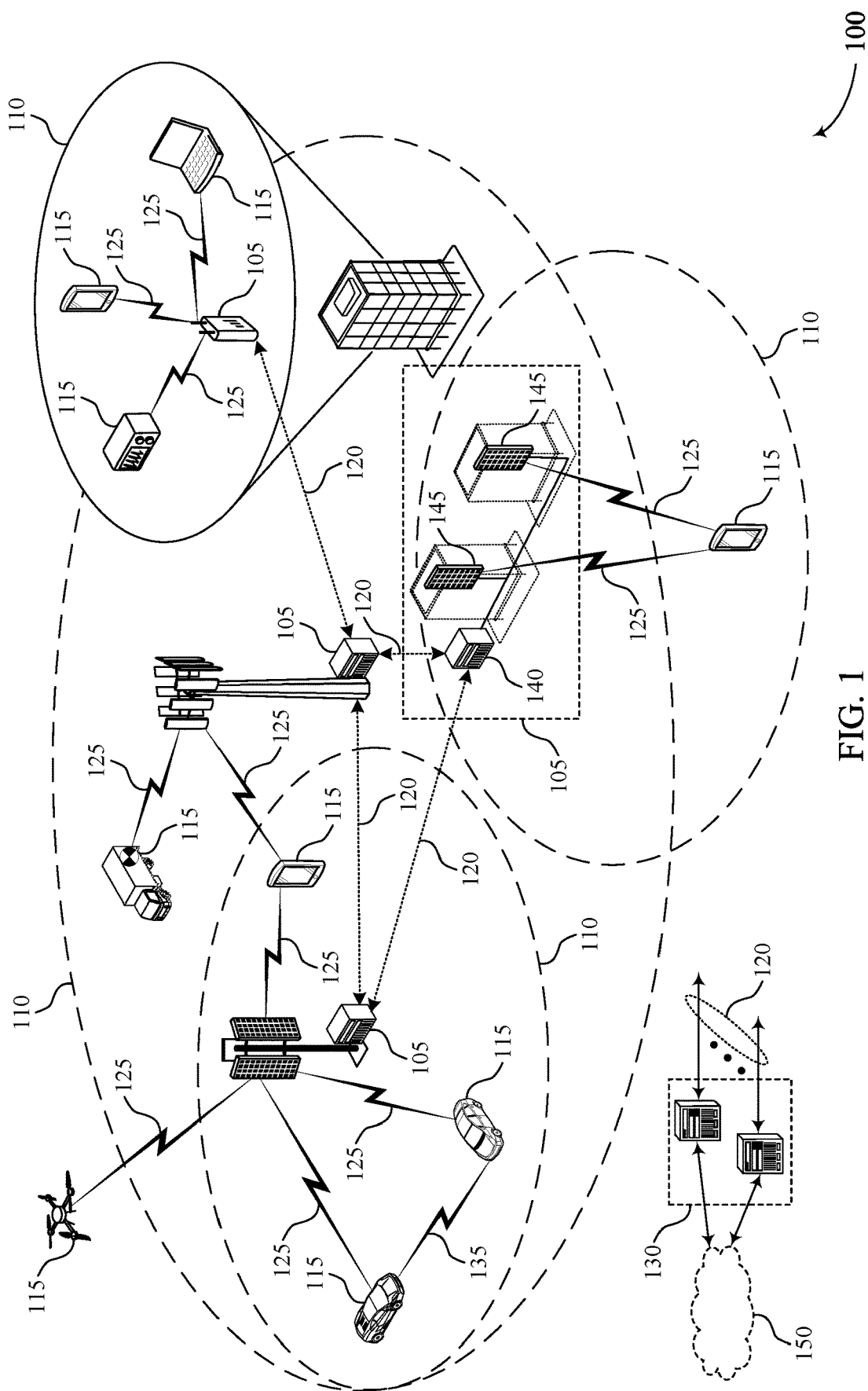
FIG. 1 illustrates an example of a system for wireless communications that supports reference signal configuration for secondary cell activation in accordance with aspects of the present disclosure.

In some wireless communications systems, the base station may communicate with a user equipment (UE) via one or more serving cells (e.g., a primary cell (PCell) and one or more secondary cells (SCells)). The network may activate one or more SCells, in addition to a PCell, at the UE to increase data throughput, to alleviate network congestion, or both. However, the process of activating a SCell may in some cases take a relatively long duration if time. For example, in some 5G NR systems, each cell may transmit relatively few reference signals and in some cases prior to activating the SCell the UE may measure one or more reference signals to obtain measurements associated with the SCell (e.g., automatic gain control (AGC) measurements, time tracking measurements, and/or frequency tracking measurements). In some cases, such UE measurements for SCell activation may be made using periodic synchronization signal block (SSB) transmissions of the SCell, which may occur at a relatively long periodicity. In order to reduce the time for activating the SCell, in some cases, a temporary reference signal may be transmitted by the SCell to allow for the UE measurements and faster activation of the SCell. Such a temporary reference signal may be an example of an aperiodic reference signal.

In accordance with some aspects of the present disclosure, an SCell activation message may indicate one or more parameters for the temporary reference signal, such as a carrier for the temporary reference signal, a slot location of the temporary reference signal, a reference signal configuration, a beam configuration for the temporary signal, or any combinations thereof. In some cases, a downlink control information (DCI) communication from the base station that activates the SCell may provide the one or more parameters for the temporary reference signal. In other cases, a medium access control (MAC) control element (CE) may provide the one or more parameters for the temporary reference signal. Additionally or alternatively, one or more parameters for the temporary reference signal may implicitly signaled by the base station.

By reducing interruption periods on active serving cells which are attributable to activation/deactivation of additional serving cells, techniques described herein may enable more reliable, efficient wireless communications and improve overall user experience.

Particular implementations of the subject matter described in this disclosure can be implemented to realize one or more of the following potential advantages. In some implementations, the described techniques may provide for improved wireless communications by reducing durations of activation times for SCells. In particular, by receiving reference signals (e.g., temporary reference signals) based on reference signal parameters associated with an activation command, a UE may activate an SCell with a reduced activation time relative to cases where the UE would use other periodically transmitted reference signals (e.g., in a SSB). By reducing activation time durations of SCells at the UE, techniques described herein may improve the efficiency and reliability of wireless communications, provide higher throughput, greater system capacity, and lower latency, among other benefits.

Aspects of the disclosure are initially described in the context of wireless communications systems. Additional aspects of the disclosure are described in the context of example resource allocation schemes, reference signal activation fields, and an example process flow. Aspects of the disclosure are further illustrated by and described with reference to apparatus diagrams, system diagrams, and flowcharts that relate to reference signal configuration for secondary cell activation.

FIG. 1 illustrates an example of a wireless communications system 100 that supports reference signal configuration for secondary cell activation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, the UEs 115 and the base stations 105 of the wireless communications system 100 may support techniques for temporary reference signal configuration for SCell activation. In particular, a UE 115 of the wireless communications system 100 may be configured to receive an aperiodic reference signal (e.g., temporary reference signal) on a SCell (e.g., a SCell that is by a same or different base station 105 that provides a PCell) in order to reduce an activation time of the SCell. For example, a UE 115 of the wireless communications system 100 may perform wireless communications with a first serving cell (e.g., PCell) supported by a base station 105. In this example, the base station 105 may transmit, to the UE 115, an indication that a second serving cell (e.g., SCell) supported by the base station 105 is to be activated at the UE 115. The base station 105 may activate the SCell at the UE 115 to increase data throughput, to alleviate network congestion, or both. In some cases, the UE 115 may receive a temporary reference signal on the SCell in order to reduce a duration of the activation time of the SCell. For example, the UE 115 may determine AGC associated with the SCell, time/frequency tracking associated with the SCell, or both, based on the received temporary reference signal, thereby enabling the UE 115 to initiate communications with the SCell relatively quickly, compared to a time duration for such activation using reference signals that have a relatively long periodicity, such reference signals transmitted with an SSB.

In some cases, the activation message that activates the SCell may provide an indication of one or more parameters of the temporary reference signal in DCI that is transmitted to the UE 115. In some cases, a same DCI that schedules a MAC-CE that carries the activation command may be used to provide the one or more parameters of the temporary reference signal. In other cases, a separate DCI may be transmitted that indicates the one or more parameters of the temporary reference signal. In further cases, a MAC-CE may indicate the one or more parameters of the temporary reference signal. Such a MAC-CE may be a same MAC-CE that provides the SCell activation command, or a different MAC-CE. Additionally or alternatively, one or more of the temporary reference signal parameters may be implicitly signaled by the activation command. For example, one or more reference signal parameters may be configured by RRC signaling, and used at the UE 115 upon receipt of the SCell activation command.

The techniques described herein may provide for improved wireless communications by reducing durations of SCell activation periods. In particular, by receiving reference signals (e.g., temporary reference signals, tracking reference signals, non-zero power CSI-RS with higher layer parameters such as trs-Info) on an activated SCell, a UE 115 may be able to determine information (e.g., AGC, time/frequency tracking) associated with the SCell, and this information determined based on the reference signals may thereby reduce a duration of the time for activation of the SCell compared to using periodic SSBs to determine the information. By reducing the activation time durations for SCell activation at the UE 115, techniques described herein may improve the efficiency and reliability of wireless communications, and improve overall user experience.

Figure 2:
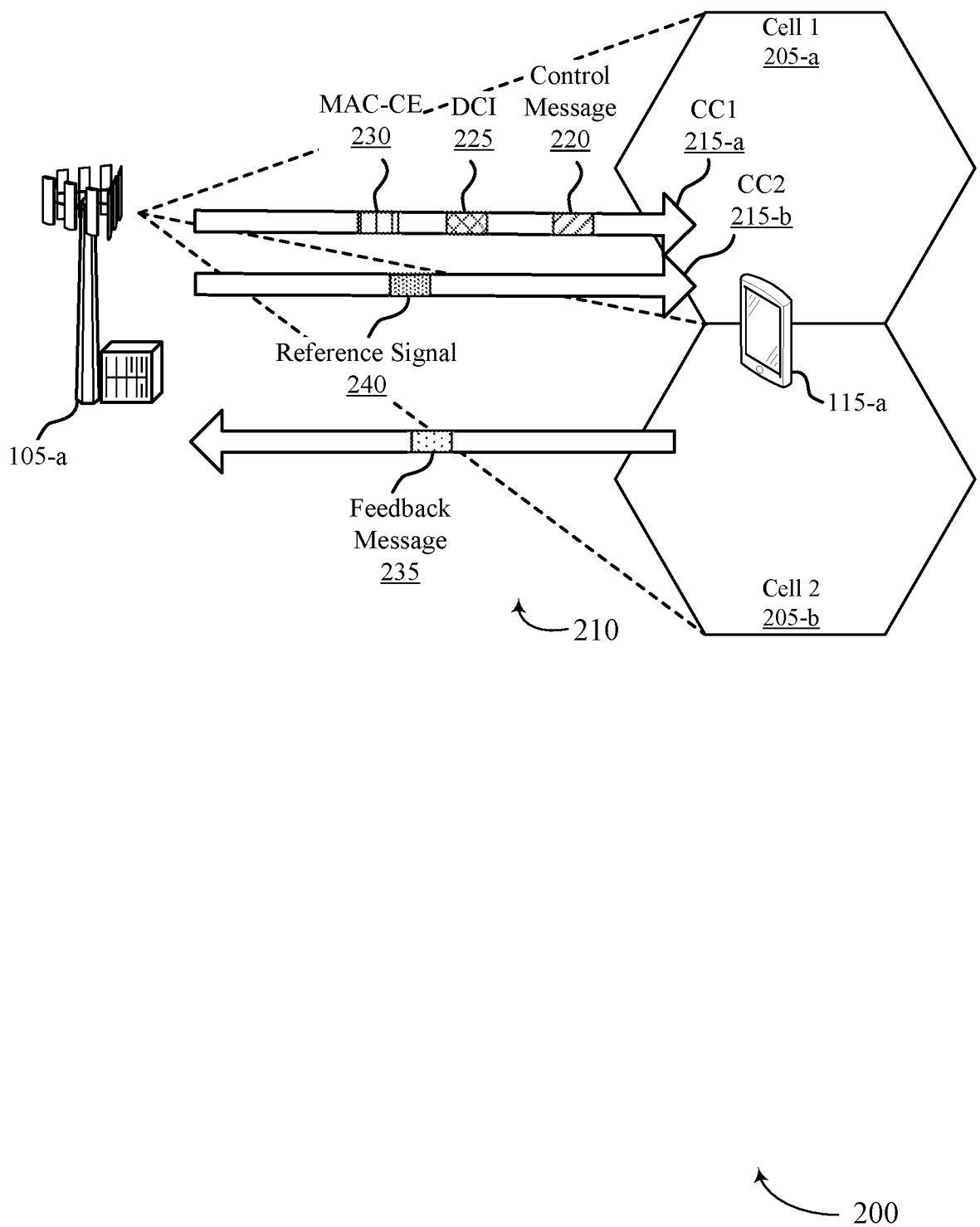
FIG. 2 illustrates an example of a portion of a wireless communications system that supports reference signal configuration for secondary cell activation in accordance with aspects of the present disclosure.

FIG. 2 illustrates an example of a wireless communications system 200 that supports reference signal configuration for SCell activation in accordance with aspects of the present disclosure. In some examples, wireless communications system 200 may implement aspects of wireless communications system 100. The wireless communications system 200 may include a UE 115-a and a base station 105-a, which may be examples of UEs 115 and base stations 105, as described with reference to FIG. 1.

The wireless communications system 200 may support wireless communications with wireless devices (e.g., UE 115-a) via one or more serving cells 205 of the wireless communications system 200. In particular, each serving cell 205 may be supported by one or more base stations 105 of the wireless communications system 200. For example, as shown in FIG. 2, the wireless communications system 200 may include a first serving cell 205-a (e.g., a PCell) supported by the base station 105-a, and a second serving cell 205-b (e.g., a SCell) supported by the base station 105-a. The serving cells 205 may also be primary-secondary cells (PSCells) of a secondary cell group (SCG), or any combinations of PCells, SCells, or PSCells of a SCG. The wireless communications system 200 may include any quantity of serving cells 205 supported by any quantity of base stations 105. For example, in additional or alternative cases, the first cell 205-a may be supported by the base station 105-a, and the second cell 205-b may be supported by a second base station which is different from the base station 105-a.

In some cases, the first serving cell 205-a and the second serving cell 205-b may be associated with the same frequency band (e.g., intra-band carrier aggregation). In some cases, the first serving cell 205-a, the second serving cell 205-b, or both, may include a PCell, an SCell, a PSCell of an SCG, or any combination thereof. For example, in cases where the first serving cell 205-a includes a PCell, the second serving cell 205-b may include an SCell. By way of another example, in cases where the first serving cell 205-a includes an SCell, the second serving cell 205-b may include an additional SCell. Moreover, in cases where the first serving cell 205-a includes a PSCell of an SCG, the second serving cell 205-b may include an SCell of the SCG.

In some cases, the first serving cell 205-a, the second serving cell 205-b, or both, may be associated with a given radio access technology, such as a 5G radio access technology, an NR access technology, a 4G radio access technology, an LTE radio access technology, or any combination thereof. In some cases, techniques described herein may be implemented in the context of dual connectivity scenarios. In this regard, the second serving cell 205-b may be associated with the same or different radio access technology as the radio access technology associated with the first serving cell 205-a. For example, in cases where the first serving cell 205-a is associated with a 5G or NR access technology, the second serving cell 205-b may be associated with a 4G radio access technology, an LTE radio access technology, or both. Moreover, in some cases, the first serving cell 205-a and the second serving cell 205-b may be associated with different frequency bands associated with a common radio access technology. For example, in some cases, both the first and second serving cells 205-a and 205-b may be associated with an NR access technology, where the first serving cell 205-a is associated with a frequency range one (FR1) frequency band of the NR access technology and the second serving cell 205-b is associated with an FR2 frequency band of the NR access technology.

In some cases, the UE 115-a may communicate with the base station 105-a using one or more beams, one or more carriers, one or more communications links, or any combination thereof. For example, each serving cell 205 may be associated with a different frequency range, separate beams, separate component carriers, and/or communications links to facilitate wireless communications between the UE 115-a and the respective serving cells 205. For example, the UE 115-a may communicate with the base station 105-a via a communication link 210, where the communication link 210 includes a first component carrier 215-a and a second component carrier 215-b. In some cases, the first component carrier 215-a may be associated with the first serving cell 205-a, and the second component carrier 215-b may be associated with the second serving cell 205-b. In some cases, the communication link 210 may include an example of an access link (e.g., a Uu link). The communication link 210 may include a bi-directional link that can include both uplink and downlink communication. For example, the UE 115-a may transmit uplink transmissions, such as uplink control signals or uplink data signals, to the base station 105-a using the communication link 210, and the base station 105-a may transmit downlink transmissions, such as downlink control signals or downlink data signals, to the UE 115-a using the communication link 210.

In some cases, the UE 115-a and the base station 105-a of the wireless communications system 200 may support techniques for SCell activation using temporary reference signals, in which temporary reference signal configuration may be indicated by a downlink communication associated with an activation command for the SCell. In particular, the UE 115-a of the wireless communications system 200 may be configured to receive a reference signal (e.g., temporary reference signal) on the second serving cell 205-b supported by the base station 105-a in order to reduce an activation time for wireless communications on the second serving cell 205-b which is attributable to the activation of the second serving cell 205-b supported by the base station 105-a.

For example, the UE 115-a may establish wireless communications with the first serving cell 205-a. In some cases, the UE 115-a may establish the wireless communications with the first serving cell 205-a by initiating or otherwise performing a setup procedure with the first serving cell 205-a. In some cases, the UE 115-a may receive a control message 220 from the base station 105-a via the first serving cell 205-a (e.g., via the first component carrier 215-a). In some cases, the control message 220 may include configuration information that indicates whether temporary reference signals are enabled, activation information for such temporary reference signals, one or more parameters for a temporary reference signal, or any combinations thereof. The control message 220 may include an RRC message, a system information block (SIB) message, an SSB message, or any combination thereof. In some aspects, the UE 115-a may receive the control message 220 based on establishing the wireless communications with the first serving cell 205-a.

In some aspects, the UE 115-a may receive, from the base station 105-a via the first serving cell 205-a, a DCI message 225 scheduling a downlink transmission (e.g., physical downlink shared channel (PDSCH) transmission and/or a MAC-CE message 230) from the base station 105-a to the UE 115-a. For example, as shown in FIG. 2, the UE 115-a may receive the DCI message 225 from the base station 105-a via the first serving cell 205-a (e.g., via the first component carrier 215-a). The DCI message 225 may be transmitted via physical downlink control channel (PDCCH) resources. In some cases, the UE 115-a may receive the DCI message 225 based on establishing the wireless communications with the first serving cell 205-a, receiving the control message 220 (e.g., RRC message, SIB message, SSB message), or any combination thereof. In some cases, the DCI message 225 may include an indication that the reference signal 240 (e.g., temporary reference signals) associated with the second serving cell 205-b, have been activated (e.g., triggered, initiated). In this regard, the UE 115-a may be configured to determine that it may monitor for the reference signal 240 on the second serving cell 205-b, based on the indication in the DCI message 225.

In some cases, the UE 115-a may receive, from the base station 105-a via the first serving cell 205-a, an indication to activate the second serving cell 205-b. For example, as shown in FIG. 2, the UE 115-b may receive a MAC-CE message 230 from the base station 105-a via the first serving cell 205-a (e.g., via the first component carrier 215-a). In this example, the MAC-CE message 230 may include an indication to activate the second serving cell 205-b. In some cases, the base station 105-a may transmit, and the UE 115-a may receive, the indication to activate the second serving cell 205-b (e.g., an SCell activation message in the MAC-CE message 230) based on the DCI message 225. For example, the DCI message 225 may schedule a PDSCH transmission (e.g., MAC-CE message 230), where the PDSCH transmission includes the indication to activate the second serving cell 205-b.

In some aspects, based on the activation message, the UE 115-a may determine a set of resources which are usable by the UE 115-*a* to receive a reference signal 240 (e.g., temporary reference signal) from the base station 105-*a* via the second serving cell 205-*b* (e.g., via a second component carrier 215-*b*). The set of resources may include a set of time resources (e.g. a slot where the reference signal 240 is located), a set of frequency resources (e.g., a carrier where the reference signal 240 is located), resource mapping of the reference signal 240, a power offset (e.g., a power difference between the reference signal 240 and one or more other communications on the second component carrier 215-*b* such as data or SSB transmissions), a quasi-co-location (QCL) assumption of the reference signal 240, a transmission configuration indicator (TCI) state of the reference signal, a set of spatial resources, or any combinations thereof.

In some cases, a same DCI message 225 that schedules a MAC-CE message 230 that carries the activation command may be used to provide the one or more parameters of the reference signal 240. In other cases, a separate DCI, such as discussed with reference to the examples of FIGS. 5-6, may be transmitted that indicates the one or more parameters of the reference signal 240. In some cases, the DCI message 225 may have a fallback DCI format or a non-fallback DCI format. In some cases, the non-fallback DCI format is a DCI format 1_1 or a DCI format 1_2, and fallback DCI format is a DCI format 1_0. In some cases, DCI 1_1 or 1_2 may include the triggering indication for the reference signal 240 on the second serving cell 205-*b*.

In further cases, the MAC-CE message 230 may indicate the one or more parameters of the reference signal 240 (e.g., the same MAC-CE message 230 that provides the SCell activation command). In other cases, a different MAC-CE may indicate the one or more parameters of the reference signal 240, such as discussed with reference to the examples of FIGS. 7-8. Additionally, or alternatively, one or more of the reference signal 240 parameters may be implicitly signaled by the activation command. For example, one or more reference signal parameters may be configured by the control message 220 (e.g., via RRC signaling), and used at the UE 115-*a* upon receipt of the SCell activation command.

In some cases, the reference signal 240 (e.g., temporary reference signal) may be triggered on the second serving cell 205-*b* to-be-activated without an explicit triggering indication provided by the DCI message 225 or MAC-CE message 230. In some cases, the reference signal 240 may be is triggered on the SCell to-be-activated and already active cell(s) in the same band without an explicit triggering indication. In some cases, one or more of the following may be identified without explicit triggering signaling: the carrier where the temporary reference signal is transmitted (e.g., the reference signal 240 may be activated on the carrier of the SCell to-be-activated or the SCell to-be-activated and any already active cell(s) in the same band); the slot where the temporary reference signal is transmitted (e.g., the slot may be higher-layer configured with timing relative to the timing of feedback message 235 for PDSCH carrying MAC-CE message 230 for SCell activation command or relative to the start of a radio frame); a configuration of the temporary reference signal (e.g., a resource mapping and/or power offset to data/SSB, for the reference signal 240, which may be configured by higher-layer signaling); the QCL assumption for the temporary reference signal, or a TCI-state for the temporary reference signal (e.g., QCL or TCI-state may be configured by higher-layer signaling).

In some cases, the UE 115-*a* may transmit feedback message 235 to the base station 105 via the first serving cell 205-*a*, the second serving cell 205-*b*, or both. For example, in cases where the MAC-CE message 230 is received via the first serving cell 205-*a*, the UE 115-*a* may transmit the feedback message 235 via the first serving cell 205-*a*. In some cases, the UE 115-*a* may transmit the feedback message 235 to the base station 105-*a* based on (e.g., in response to) receiving the indication to activate the second serving cell 205-*b*. The feedback message 235 may include an acknowledgement (ACK) message, a negative acknowledgement (NACK) message, or both. For example, in cases where the indication within the MAC-CE message 230 includes an activation of the second serving cell 205-*b*, the UE 115-*a* may transmit an ACK message in response to the activation of the second serving cell 205-*b*. In some cases, the UE 115-*a* may determine and/or adjust AGC associated with the second serving cell 205-*b*, tracking (e.g., time tracking, frequency tracking) associated with the second serving cell 205-*b*, or any combination thereof.

Figure 3:
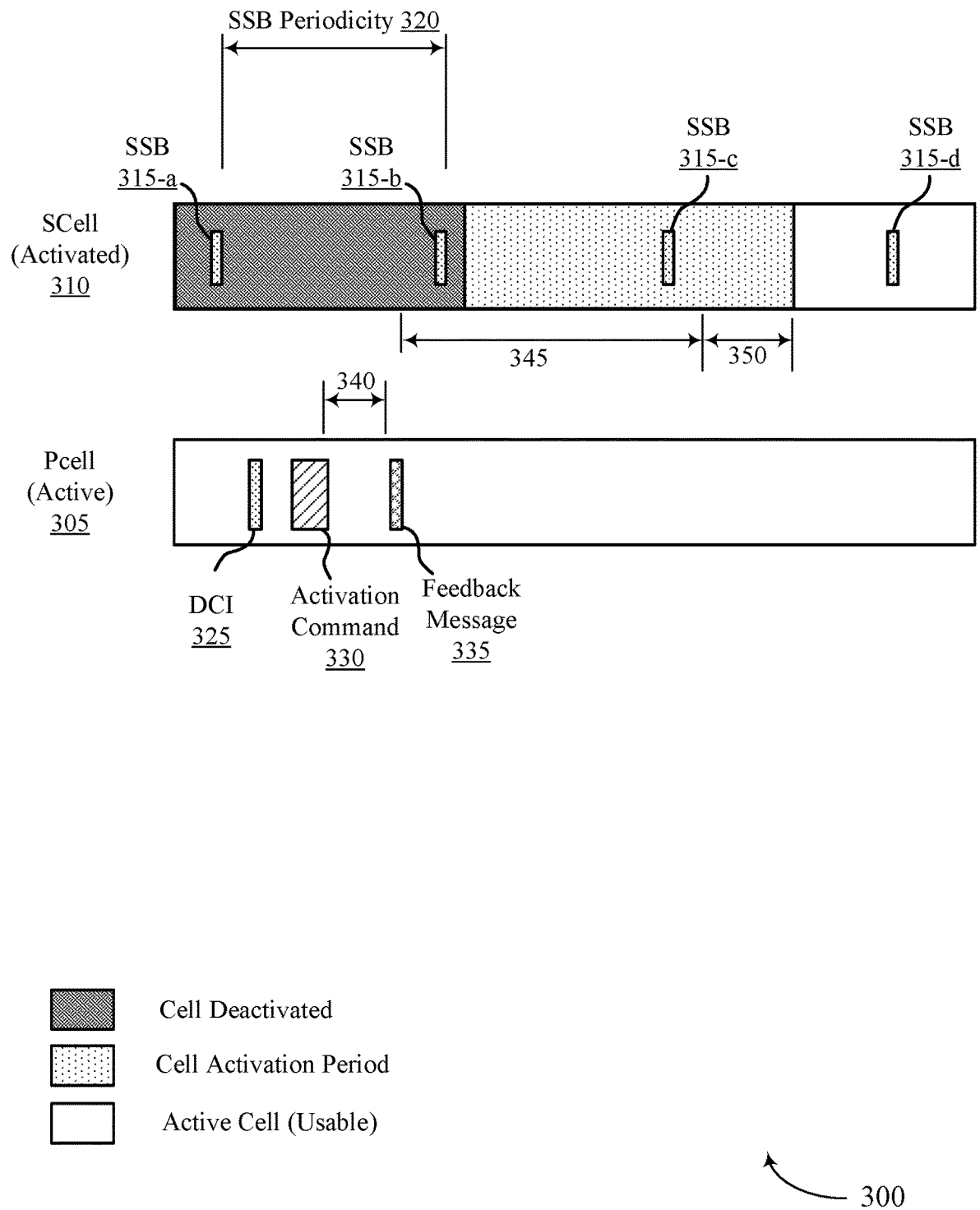
FIGS. 3 through 8 illustrate examples of resource allocation schemes that support reference signal configuration for secondary cell activation in accordance with aspects of the present disclosure.

FIG. 3 illustrates an example of a resource allocation scheme 300 that supports reference signal configuration for SCell activation in accordance with aspects of the present disclosure. In some examples, resource allocation scheme 300 may implement aspects of wireless communications system 100 or 200. The resource allocation scheme 300 in this example illustrates activation of a serving cell using a periodic reference signal for one or more cell measurements, rather than a temporary reference signal.

The resource allocation scheme 300 may include a first serving cell, namely PCell 305, and an SCell 310 that is to be activated at a UE. In some cases, the base station serving the SCell 310 (which may be a same base station as serving the PCell 305 or a different base station) may be configured to transmit SSB 315 to the UE via the SCell 310 according to an SSB periodicity 320. For example, in the context of an NR access technology, the base station may transmit an SSB 315 according to a 10 ms SSB periodicity 320, a 20 ms SSB periodicity 320, or another duration.

The UE may receive, via the PCell 305, a DCI 325 which schedules a PDSCH transmission (e.g., that includes MAC-CE message having an activation command 330 for the SCell 310) from the base station to the UE. Subsequently, the UE may receive the PDSCH transmission (e.g., MAC-CE message) based on the DCI 325. The UE may transmit, to the base station via the PCell 305, a feedback message 335 (e.g., ACK message) in response to successfully receiving the indication to activate the SCell 310 via the PDSCH transmission.

In this example, an SCell activation time may be based on an activation time 345, a timing of the feedback message 335, the SSB periodicity 320, and a timing for a channel state information (CSI) report. In some cases, the time for SCell activation may be determined as:

$$SCell\ activation\ delay = \{T_{HARQ} + T_{activation\ time} + T_{CSI\ reporting}\}/NR\ slot\ length$$

where $T_{HARQ}$ is the timeline 340 from the activation command 330 until the feedback message 335 (e.g., HARQ ACK) is transmitted, $T_{activation\ time}$ is an activation time 345 corresponding to a first SSB 315-*c* ($T_{FirstSSB}$) plus 5 ms, where $T_{FirstSSB}$ is the time to first SSB 315-*c* indicated by the SSB measurement timing configuration (SMTC) after slot n (with PDSCH)+$T_{HARQ}$+3 ms, and where $T_{CSI\ reporting}$ is a delay time 350 until a first available CSI report, including uncertainties of CSI-RS resource and CSI report.

Accordingly, in cases where a temporary reference signal is not transmitted on the SCell 310, the UE may use signals provided with SSBs 315 to perform measurements and activate the SCell 310. In some cases, the base station may not trigger a temporary reference signal, and thus the timing as illustrated in FIG. 3 may be used for SCell 310 activation. For example, in cases where the PDSCH resources used to transmit the PDSCH transmission are relatively close to a measurable SSB 315 occasion, the base station may determine not to trigger a temporary reference signal. In other cases, the base station may trigger a temporary reference signal (e.g., in a MAC-CE), but after the transport block with the MAC-CE is formatted, the base station may determine that the temporary reference signal is not to be transmitted, and may indicate in a DCI that the temporary reference signal is canceled, in which case the timing of the SCell 310 activation may be as illustrated in FIG. 3. Examples of a base station cancelling a temporary reference signal trigger are discussed in more detail with reference to the example of FIG. 8.

Figure 4:
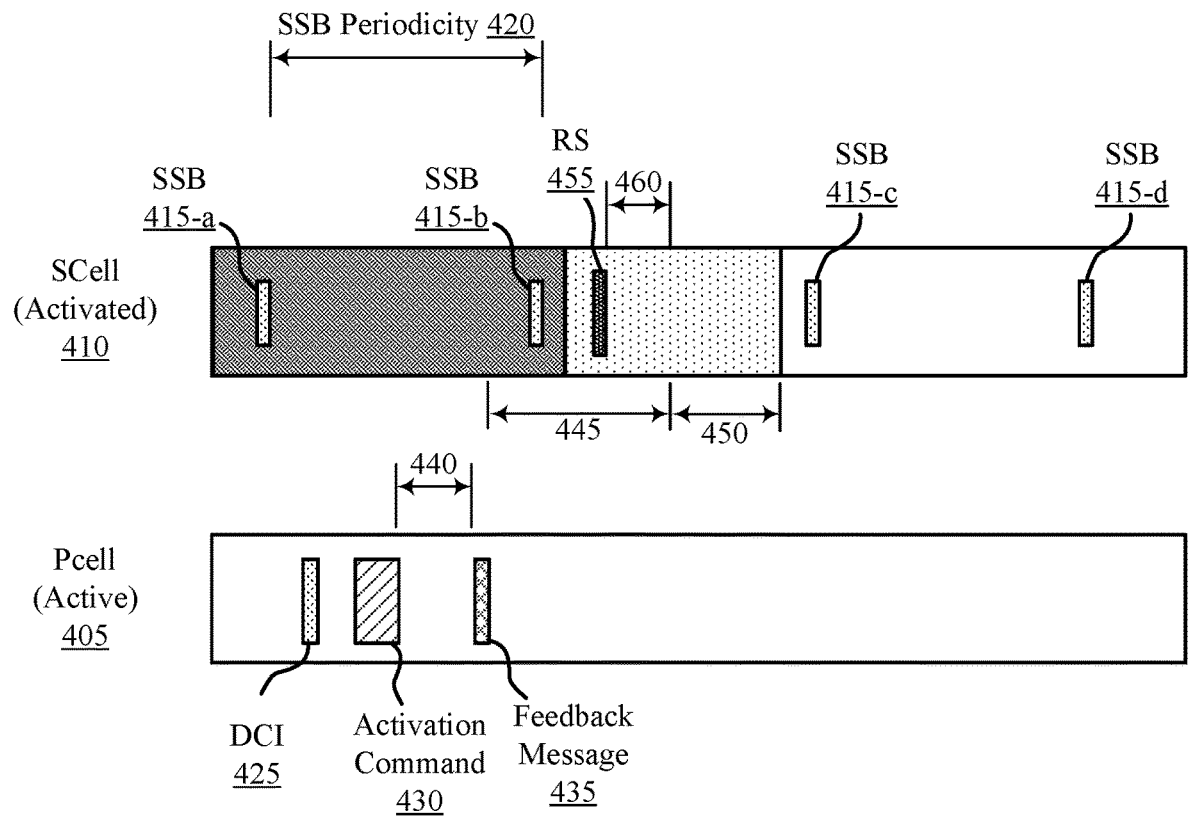

FIG. 4 illustrates another example of a resource allocation scheme 400 that supports reference signal configuration for SCell activation in accordance with aspects of the present disclosure. In some examples, resource allocation scheme 400 may implement aspects of wireless communications system 100 or 200. The resource allocation scheme 400 in this example illustrates activation of a serving cell using a temporary reference signal 455 for one or more cell measurements, rather than a periodic reference signal.

Similarly as above, the resource allocation scheme 400 may include a first serving cell, namely PCell 405, and an SCell 410 that is to be activated at a UE. In some cases, the base station serving the SCell 410 (which may be a same base station as serving the PCell 405 or a different base station) may be configured to transmit SSB messages 415 to the UE via the SCell 410 according to an SSB periodicity 420. The UE may receive, via the PCell 405, DCI 425 which schedules a PDSCH transmission 430 (e.g., that includes MAC-CE message having an activation command for the SCell 410) from the base station to the UE. Subsequently, the UE may receive the PDSCH transmission 430 (e.g., MAC-CE message) based on the DCI 425. The UE may transmit, to the base station via the PCell 405, a feedback message 435 (e.g., ACK message) in response to successfully receiving the indication to activate the SCell 410 via the PDSCH transmission 430.

In some aspects, the PDSCH transmission 430 (e.g., MAC-CE message) may trigger the UE to measure temporary reference signal 455. In this example, the temporary reference signal 455 may be transmitted on the SCell 410 and may allow for UE measurements in advance of when such measurements could otherwise be made using reference signals provided with SSB messages 415, such as discussed with reference to FIG. 3. In this example, an SCell activation delay may again be determined as:

$$\text{SCell activation delay} = \{T_{HARQ} + T_{activation\ time} + T_{CSI\ reporting}\} / NR \text{ slot length}$$

where $T_{HARQ}$ is the timeline 340 from the activation command 330 until the feedback message 435 (e.g., HARQ ACK) is transmitted. In this case, however, $T_{activation\ time}$ 445 is reduced relative to the example of FIG. 3, and corresponds to a temporary reference signal 455 time ($T_{temp\ RS}$) plus 5 ms, where T temp RS is the time to the temporary reference signal 455 after slot n (with PDSCH)+$T_{HARQ}$+3 ms. The value of $T_{CSI\ reporting}$ is the delay time 450 until the first available CSI report, including uncertainties of CSI-RS resource and CSI report.

Thus, in this example, the SCell activation delay is reduced relative to that discussed in the example of FIG. 3, which may result in faster SCell 410 activation, higher throughout, reduced latency, and other benefits. In accordance with various aspects discussed herein, one or more parameters of the temporary reference signals 455 may be indicated by the DCI 425, the MAC-CE in the PDSCH transmission 430, a different DCI or MAC-CE, or combinations thereof, several examples of which are discussed herein. Additionally, or alternatively, the UE may be configured to implicitly determine that the temporary reference signal 455 on the SCell 410 has been activated and one or more parameters associated therewith, as discussed herein.

In some cases, the one or more parameters associated with the temporary reference signal 455 may include, for example, a carrier where the temporary reference signal 455 is transmitted. In some cases, the temporary reference signal 455 may be an aperiodic transmission of a tracking reference signal (TRS). In some cases, for aperiodic TRS transmissions, carrier may be informed by one or multiple carriers of the corresponding CSI-ReportConfig associated with CSI-AssociatedReportConfigInfo (e.g., that provides information for a TRS as a non-zero power (NZP) channel state information reference signal (CSI-RS)), and in some examples some aspects of a CSI request field may be reused for triggering the temporary reference signal 455, and to provide carrier information. The one or more parameters of the temporary reference signal 455 may also include a slot where the temporary reference signal 455 is transmitted. In cases where a TRS is used, the slot may be informed by an aperiodicTriggeringOffset in the NZP-CSI-RS-ResourceSet in the CSI-ResourceConfig, where aperiodicTriggeringOffset tells the number of slots from the aperiodic TRS triggering DCI to the aperiodic TRS transmission, and such signaling may be reused in cases where the CSI request field is reused to trigger the temporary reference signal 455.

The one or more parameters of the temporary reference signal 455 may also include a configuration of the temporary reference signal 455, such as resource mapping or power offset to data/SSB. In cases where TRS is used, the configuration may be informed by NZP-CSI-RS-ResourceSet, which is configured to an entry of aperiodicTriggeringOffset of CSI-AperiodicTriggerStateList, and such signaling may be reused in cases where the CSI request field is reused to trigger the temporary reference signal 455. The one or more parameters of the temporary reference signal 455 may also include a QCL assumption or TCI-state for the temporary reference signal 455. In cases where TRS is used as the temporary reference signal 455, the TRS may be QCLed with periodic TRS in the same carrier, which may be used to determine the QCL assumption or TCI-state for the temporary reference signal 455. While TRS is used as the temporary reference signal 455 in some cases, in other cases other reference signals may be used in addition to or alternatively to TRS. For example, the temporary reference signal 455 may be an aperiodic CSI-RS, a periodic or semi-persistent CSI RS (P/SP-CSI-RS), a sounding reference signal (SRS), a reference signal based on a secondary synchronization signal (SSS) or primary synchronization signal (PSS), or combinations thereof.

Figure 5:
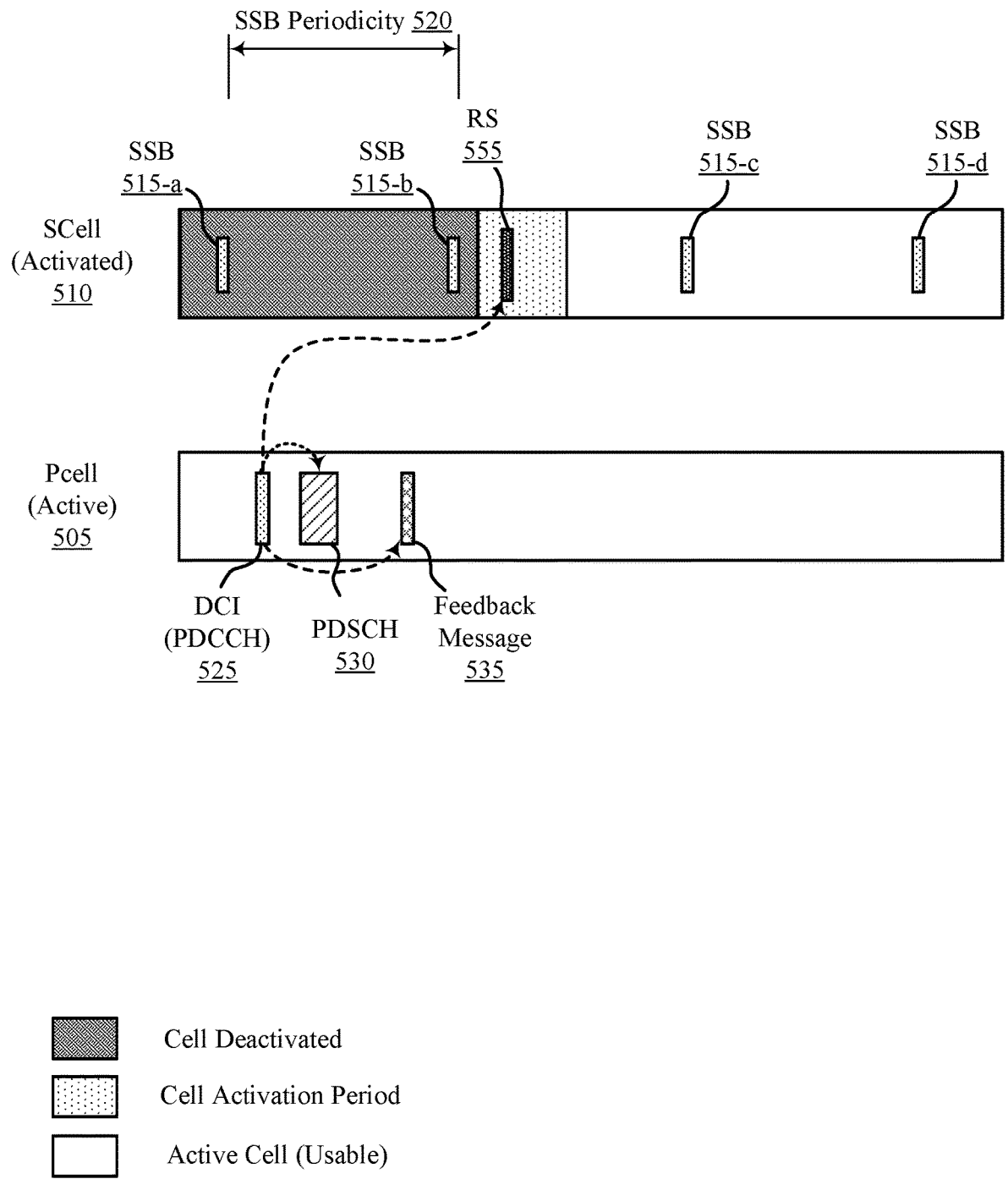

FIG. 5 illustrates another example of a resource allocation scheme 500 that supports reference signal configuration for SCell activation in accordance with aspects of the present disclosure. In some examples, resource allocation scheme 500 may implement aspects of wireless communications system 100 or 200. The resource allocation scheme 500 in this example illustrates activation of a serving cell using a temporary reference signal 555 for one or more cell measurements.

Similarly as above, the resource allocation scheme 500 may include a first serving cell, namely PCell 505, and an SCell 510 that is to be activated at a UE. In some cases, the base station serving the SCell 510 (which may be a same base station as serving the PCell 505 or a different base station) may be configured to transmit SSB messages 515 to the UE via the SCell 510 according to an SSB periodicity 520. The UE may receive, via the PCell 505, DCI 525 which schedules a PDSCH transmission 530 (e.g., that includes MAC-CE message having an activation command for the SCell 510) from the base station to the UE. Subsequently, the UE may receive the PDSCH transmission 530 (e.g., MAC-CE message) based on the DCI 525. The UE may transmit, to the base station via the PCell 505, a feedback message 535 (e.g., ACK message) in response to successfully receiving the indication to activate the SCell 510 via the PDSCH transmission 530.

In this example, the DCI 525 may be used to provide one or more parameters associated with the temporary reference signal 555. In some cases, a DCI format of the DCI 552 may inform the UE of one or more of the carrier where the temporary reference signal 555 is transmitted, a slot where the temporary reference signal 555 is transmitted, a configuration of the temporary reference signal 555 (e.g., resource mapping, power offset to data/SSB), or the QCL assumption or TCI-state for the temporary reference signal 555. In some cases, the DCI format of the DCI 525 that schedules the PDSCH transmission 530 carrying the SCell activation command MAC-CE tells the UE of the temporary reference signal information. The DCI format may include PDSCH scheduling information for the scheduled cell (e.g., SCell 510), and temporary reference signal 555 triggering information for the SCell 510 to-be-activated. In some cases, the temporary reference signal 555 triggering information may include a defined request field in the DCI format with parameters for the temporary reference signal 555 (e.g., the DCI may reuse a CSI request field from an uplink grant that is defined for the downlink DCI format). In some cases, the temporary reference signal 555 is triggered at least a predetermined time period (e.g., 3 ms) after the feedback message 535 transmission for the PDSCH transmission 530.

Figure 6:
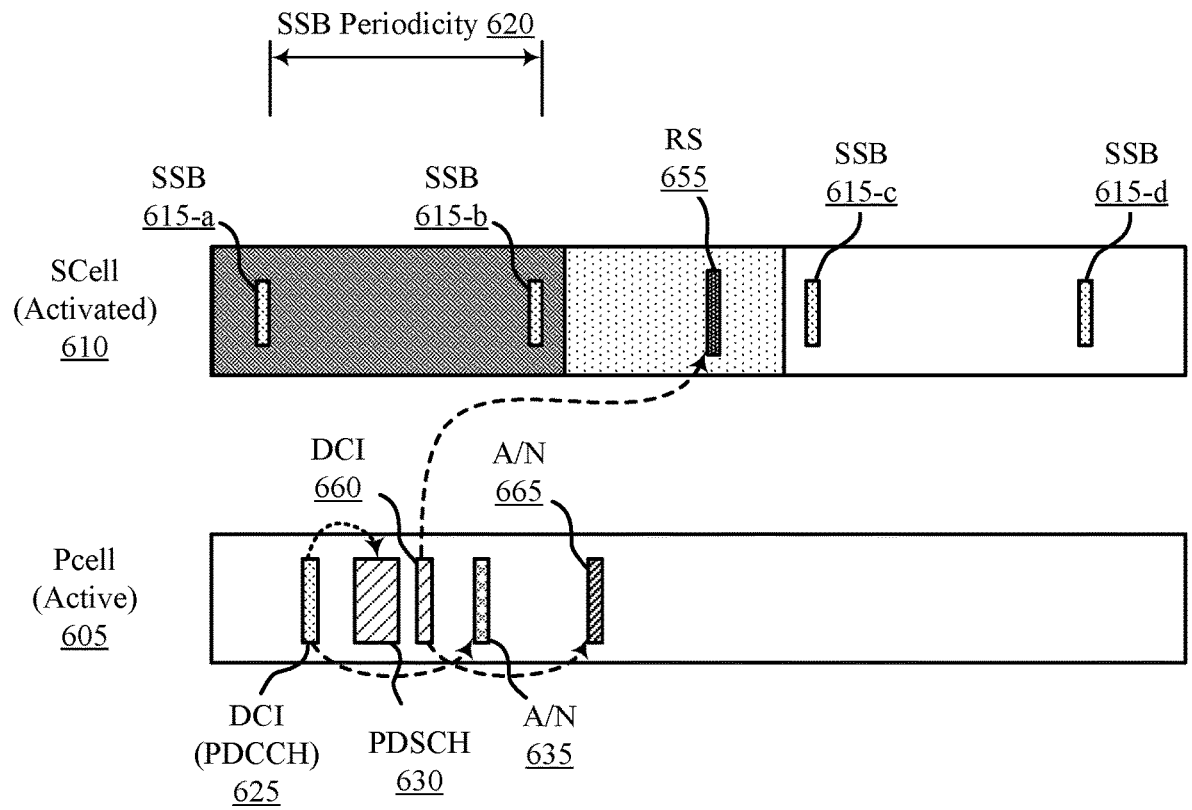

FIG. 6 illustrates an example of a resource allocation scheme 600 that supports reference signal configuration for SCell activation in accordance with aspects of the present disclosure. In some examples, resource allocation scheme 600 may implement aspects of wireless communications system 100 or 200. The resource allocation scheme 600 in this example illustrates activation of a serving cell using a temporary reference signal 655 for one or more cell measurements.

Similarly as above, the resource allocation scheme 600 may include a first serving cell, namely PCell 605, and an SCell 610 that is to be activated at a UE. In some cases, the base station serving the SCell 610 (which may be a same base station as serving the PCell 605 or a different base station) may be configured to transmit SSB messages 615 to the UE via the SCell 610 according to an SSB periodicity 620. The UE may receive, via the PCell 605, DCI 625 which schedules a PDSCH transmission 630 (e.g., that includes MAC-CE message having an activation command for the SCell 610) from the base station to the UE. Subsequently, the UE may receive the PDSCH transmission 630 (e.g., MAC-CE message) based on the DCI 625. The UE may transmit, to the base station via the PCell 605, a feedback message 635 (e.g., ACK message) in response to successfully receiving the indication to activate the SCell 610 via the PDSCH transmission 630.

In this example, a second DCI 660 may be used to provide one or more parameters associated with the temporary reference signal 655. In some cases, a DCI format of the second DCI 660 may be different than a DCI format of DCI 625 that schedules the PDSCH transmission 630 carrying the SCell activation command MAC-CE. In some cases, the second DCI format includes PDSCH scheduling information for the scheduled cell (e.g., PCell 605), and temporary reference signal 655 triggering information for the SCell 610 to-be-activated. In some cases, the temporary reference signal 655 triggering information may include a defined request field that indicates one or more reference signal parameters (e.g., the request field may reuse of CSI request field from an uplink grant, similarly as discussed with reference to FIG. 5). In some cases, the temporary reference signal 655 may be triggered at least a predetermined time period (e.g., 3 ms) after the ACK/NACK transmission (e.g., feedback message 635) for the PDSCH transmission 630.

In other cases, the second DCI format does not include PDSCH scheduling information for any cell, but includes temporary reference signal 655 triggering information for the SCell 610 to-be-activated. The temporary reference signal 655 triggering information may again be provided in a request field, and in some cases, may be a reuse of PDSCH scheduling information fields (e.g., a frequency domain resource assignment (FDRA) field). In some cases, the temporary reference signal 655 may be triggered at least a predetermined time period (e.g., 3 ms) after the second DCI 660 with the temporary reference signal 655 triggering, or at least a predetermined time period (e.g., 3 ms) after a second ACK/NACK transmission 665 transmission for the second DCI 660 (if HARQ feedback for the associated PDCCH is reception is enabled).

As discussed, in some cases a DCI from the base station may include a field that provides an indication of the one or more temporary reference signal 655 parameters. In some cases, the DCI may reuse a CSI request field from an uplink grant to indicate the temporary reference signal 655 parameters, in which a number of bits in the field is either configured by RRC signaling or is determined by a number of TRS triggering states. In some cases, a TRS triggering field is linked to {TRS timing/slot, TRS configuration (resource and/or power offset)} for one or multiple serving cells. In other cases, the DCI may reuse one or more PDSCH scheduling information fields in a downlink DCI format that triggers the temporary reference signal 655. For example, the time/frequency resources that the temporary reference signal 655 is mapped to may be indicated by FDRA/TDRA fields that may be present for PDSCH scheduling.

In some cases, the temporary reference signal 655 triggering by a DCI is supported for both a fallback DCI format (e.g., DCI format 1_0) and a non-fallback DCI format (e.g., DCI format 1_1). In some cases, the temporary reference signal triggering field may indicate no transmission of the temporary reference signal 655, in which case the UE utilizes the SSB for activation in a similar manner as discussed with reference to the example of FIG. 3. In some cases, the temporary reference signal 655 triggering by a DCI is supported only for particular DCI formats. For example one particular DCI format may be a non-fallback DCI format (e.g., DCI format 1_1), and if the PDSCH carrying MAC-CE for SCell 610 activation is scheduled by a fallback DCI format (e.g., DCI format 1_0), then the DCI format may not have a temporary reference signal triggering field, and a temporary reference signal is assumed to be not transmitted, in which case the UE may utilize the SSB for activation in a similar manner as discussed with reference to the example of FIG. 3. In some cases, the particular DCI format is explicitly configured by the base station via RRC signaling. In further cases, the temporary reference signal 655 triggering by a DCI may be supported only for a DCI format in a particular search space set (or sets). For example, the particular search space set may be a UE-specific search space set, and if the PDSCH carrying the MAC-CE for SCell 610 activation is scheduled by a DCI format in a common search space (CSS) set, then the DCI format may not have a temporary reference signal triggering field, and a temporary reference signal is assumed to be not transmitted (e.g., similarly as discussed with reference to FIG. 3). In some cases, the particular search space set is explicitly configured by the base station via RRC signaling.

Figure 7:
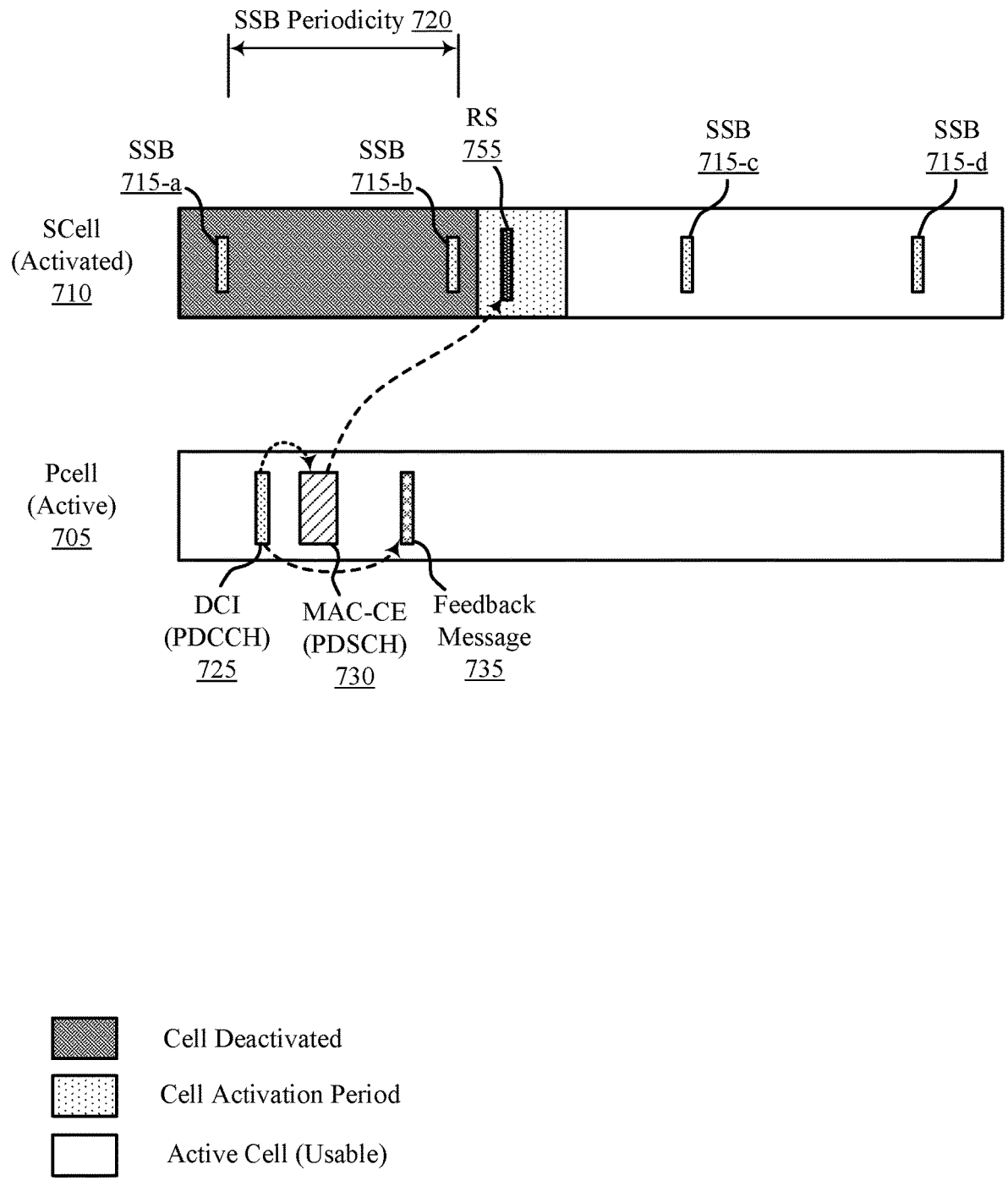

FIG. 7 illustrates an example of a resource allocation scheme 700 that supports reference signal configuration for SCell activation in accordance with aspects of the present disclosure. In some examples, resource allocation scheme 700 may implement aspects of wireless communications system 100 or 200. The resource allocation scheme 700 in this example illustrates activation of a serving cell using a temporary reference signal 755 for one or more cell measurements.

Similarly as above, the resource allocation scheme 700 may include a first serving cell, namely PCell 705, and an SCell 710 that is to be activated at a UE. In some cases, the base station serving the SCell 710 (which may be a same base station as serving the PCell 705 or a different base station) may be configured to transmit SSB messages 715 to the UE via the SCell 710 according to an SSB periodicity 720. The UE may receive, via the PCell 705, DCI 725 which schedules a PDSCH transmission 730 (e.g., that includes MAC-CE message having an activation command for the SCell 710) from the base station to the UE. Subsequently, the UE may receive the PDSCH transmission 730 (e.g., MAC-CE message) based on the DCI 725. The UE may transmit, to the base station via the PCell 705, a feedback message 735 (e.g., ACK message) in response to successfully receiving the indication to activate the SCell 710 via the PDSCH transmission 730.

In this example, a MAC-CE in the PDSCH transmission 730 may be used to provide one or more parameters associated with the temporary reference signal 755. For example, such a MAC-CE may provide an indication of one or more of a carrier where the temporary reference signal 755 is transmitted, a slot where the temporary reference signal 755 is transmitted, a configuration of the temporary reference signal 755 (e.g., resource mapping or power offset to data/SSB), or a QCL assumption or TCI-state for the temporary reference signal. In some cases, the PDSCH transmission 730 carrying the MAC-CE for the SCell 710 activation also carries the MAC-CE for the temporary reference signal 755 trigger. The PDSCH transmission 730 carrying the MAC-CE of SCell 710 activation command, in this example, also carries the MAC-CE of temporary reference signal 755 triggering on the SCell 710 to-be-activated.

In some cases, a same MAC-CE may jointly indicate SCell 710 activation and temporary reference signal 755 triggering. In other cases, a first MAC-CE indicates SCell 710 activation and another MAC-CE indicates temporary reference signal 755 triggering. In some cases, the temporary reference signal 755 may triggered at least a predetermined time period (e.g., 3 ms) after the feedback message 735 transmission for the PDSCH transmission 730.

Figure 8:
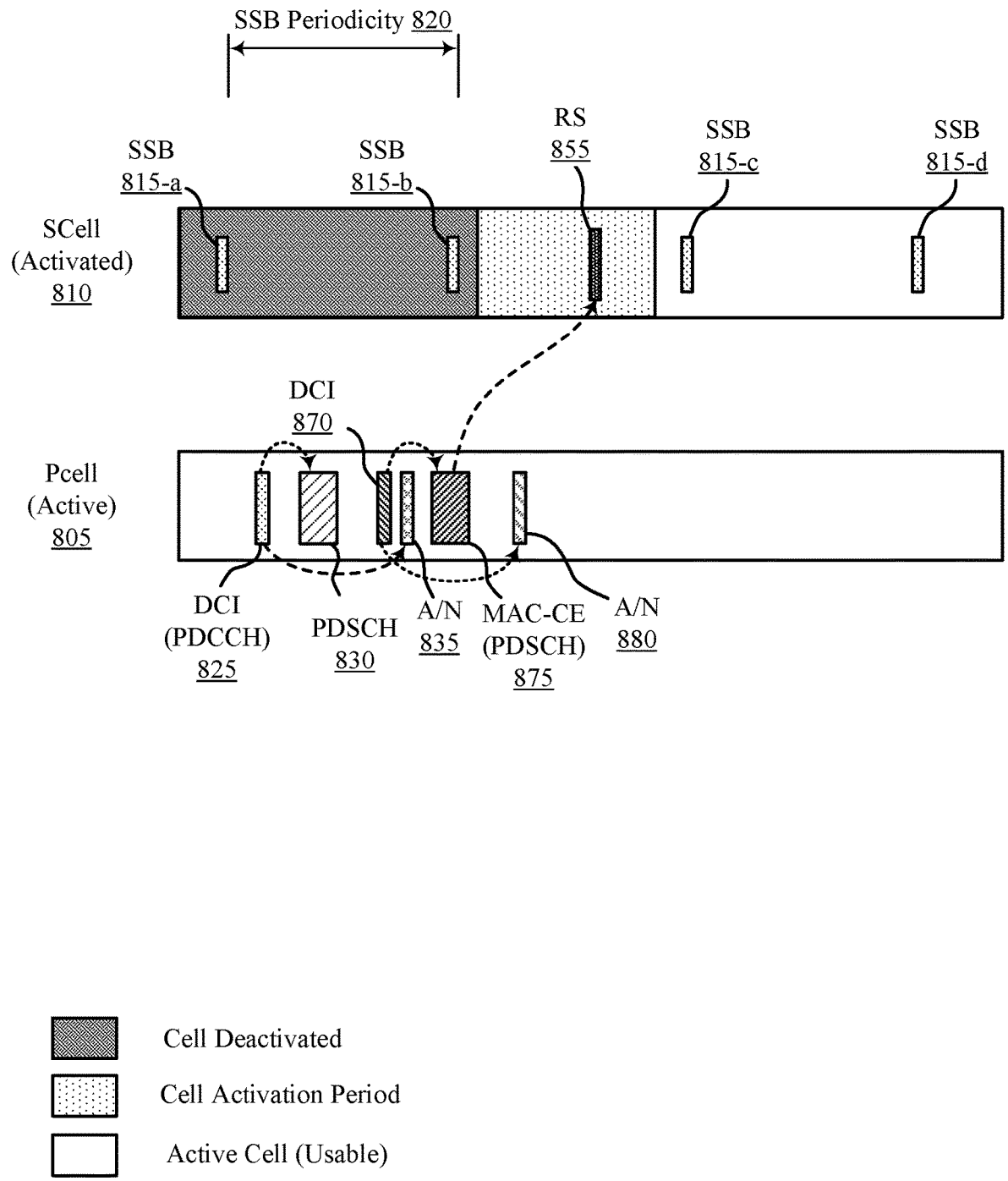

FIG. 8 illustrates an example of a resource allocation scheme 800 that supports reference signal configuration for SCell activation in accordance with aspects of the present disclosure. In some examples, resource allocation scheme 800 may implement aspects of wireless communications system 100 or 200. The resource allocation scheme 800 in this example illustrates activation of a serving cell using a temporary reference signal 855 for one or more cell measurements.

Similarly as above, the resource allocation scheme 800 may include a first serving cell, namely PCell 805, and an SCell 810 that is to be activated at a UE. In some cases, the base station serving the SCell 810 (which may be a same base station as serving the PCell 805 or a different base station) may be configured to transmit SSB messages 815 to the UE via the SCell 810 according to an SSB periodicity 820. The UE may receive, via the PCell 805, a first DCI 825 which schedules a first PDSCH transmission 830 (e.g., that includes MAC-CE message having an activation command for the SCell 810) from the base station to the UE. Subsequently, the UE may receive the first PDSCH transmission 830 (e.g., MAC-CE message) based on the first DCI 825. The UE may transmit, to the base station via the PCell 805, a feedback message 835 (e.g., ACK/NACK message) in response to successfully receiving the indication to activate the SCell 810 via the first PDSCH transmission 830.

In this example, a second DCI 870 may schedule a second PDSCH transmission 875 that includes a second MAC-CE that may be used to provide one or more parameters associated with the temporary reference signal 855. For example, such a second MAC-CE may provide an indication of one or more of a carrier where the temporary reference signal 855 is transmitted, a slot where the temporary reference signal 855 is transmitted, a configuration of the temporary reference signal 855 (e.g., resource mapping or power offset to data/SSB), or a QCL assumption or TCI-state for the temporary reference signal. Thus, the first PDSCH transmission 830 indicates SCell 810 activation and a second MAC-CE in the second PDSCH transmission 875 indicates temporary reference signal triggering and associated parameters. In some case, the temporary reference signal 855 may be triggered at least a predetermined time period (e.g., 3 ms) after an ACK/NACK transmission 880 of the second PDSCH transmission 875.

With reference to the examples of FIGS. 7 and 8, in some cases, the MAC-CE contents cannot be changed once the transport block is generated. In such cases, once temporary reference signal triggering is indicated by a MAC-CE carried by a PDSCH, that indication is kept in the initial transmission and any re-transmission of the transport block. Thus, if the base station wants to trigger a temporary reference signal for SCell activation at a certain timing, if the PDSCH decoding is failed and the PDSCH is re-transmitted, then the base station may no longer want to trigger temporary reference signal for SCell activation. For example, for a re-transmission, an SSB on the SCell to-be-activated may be expected to be available right after ACK+3 ms for the PDSCH carrying MAC-CE SCell activation command, and a temporary reference signal is not needed. Accordingly, for a re-transmission, PDSCHs for other UEs may be scheduled at the timing where the temporary reference signal for the concerned UE is supposed to be transmitted, in which case the base station may want to prioritize PDSCH scheduling for other UEs, rather than using resources for a temporary reference signal for the SCell activation of this concerned UE.

In order to allow the base station to cancel a transmission of a temporary reference signal, in some cases, the base station may enable turning off the temporary reference signal indication provided in the MAC-CE through a DCI indication. In some cases, the temporary reference signal triggering by a MAC-CE is enabled only if the PDSCH carrying the MAC-CE is scheduled by a particular DCI format. For example, the particular DCI format may be a non-fallback DCI format (e.g., DCI format 1_1), and if the PDSCH carrying MAC-CE with a SCell activation command is scheduled by a fallback DCI format (e.g., DCI format 1_0), then the DCI format may not have a temporary reference signal triggering field, and a temporary reference signal is assumed to be not transmitted, in which case the UE utilizes the SSB for activation in a manner similar as discussed with reference to FIG. 3. Otherwise, if a non-fallback DCI format is used, the temporary reference signal is transmitted. In some cases, the particular DCI format may be explicitly configured by the base station via RRC signaling. In other cases, the temporary reference signal triggering by a MAC-CE is enabled only if the PDSCH carrying the MAC-CE is scheduled by particular search space set. For example, the particular search space set may be a UE-specific search space set. Thus, if the PDSCH carrying MAC-CE for an SCell activation command is scheduled by a DCI format in a common search space (CSS) set, then the DCI format may not have a temporary reference signal triggering field, and a temporary reference signal is assumed to be not transmitted. The particular search space set may be explicitly configured by the base station via RRC signaling.

FIG. 9 illustrates examples of reference signal activation fields 900 that support reference signal configuration for SCell activation in accordance with aspects of the present disclosure. In some examples, reference signal activation fields 900 may implement aspects of wireless communications system 100 or 200. As discussed with reference to FIGS. 7 and 8, a MAC-CE may be used to provide temporary reference signal triggering and one or more associated parameters.

The MAC-CE may trigger the temporary reference signal through one or more activation or triggering fields in the MAC-CE. In a first example 905, a MAC-CE jointly indicates SCell activation and temporary reference signal triggering. In this example 905, a SCell activation field 910 may contain a Ci field which indicates the SCell to be activated, and a TRS triggering field 915 that indicates temporary reference signal details $\{T_i,j\}$ with $j=0, 1, \ldots$, that carries indication of temporary reference signal for the cell having index i, or for the i-th cell amongst the SCells to-be-activated by this MAC-CE.

In a second example 920, the PDSCH carrying the MAC-CE for the SCell activation may be different than the PDSCH carrying the MAC-CE for the temporary reference signal trigger. In this example 920, the MAC-CE for SCell activation may be unchanged from traditional MAC-CEs, and the MAC-CE for the temporary reference signal may have TRS triggering field 925 with $\{T_i,j\}$ with $j=0, 1, \ldots$, which carries an indication of temporary reference signal for the cell having index i. In a third example 930, a MAC-CE may have a carrier indication field 935 with $\{C_i\}$ with $i=0, 1, \ldots$, which indicates which carrier the temporary reference signal is triggered, and a TRS triggering field 940 with $\{T_i,j\}$ with $j=0, 1, \ldots$, that carries an indication of the temporary reference signal for the serving cell corresponding to Ci.

Figure 10:
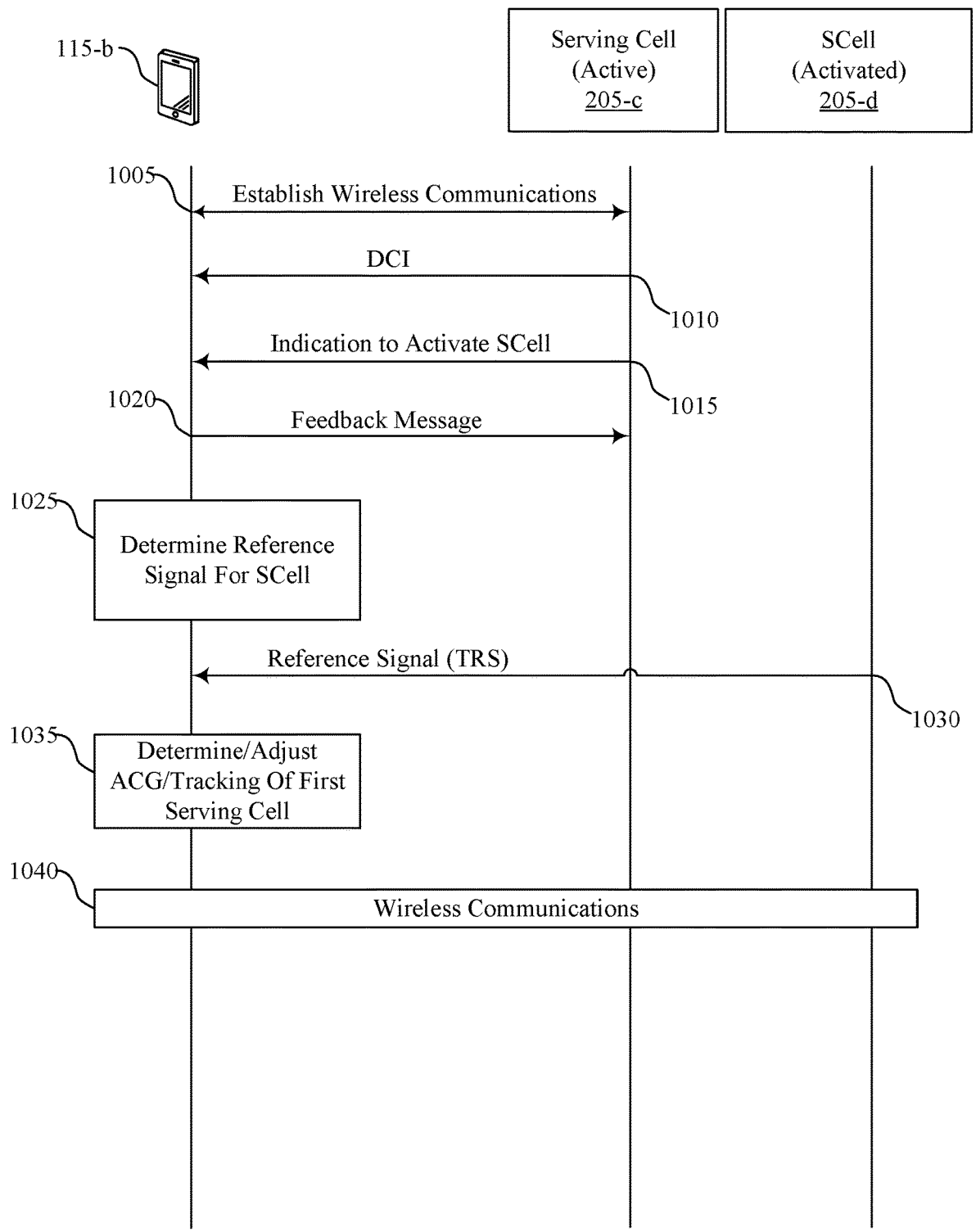
FIG. 10 illustrates an example of a process flow that supports reference signal configuration for secondary cell activation in accordance with aspects of the present disclosure.

FIG. 10 illustrates an example of a process flow 1000 that supports reference signal configuration for SCell activation in accordance with aspects of the present disclosure. In some examples, process flow 1000 may implement aspects of wireless communications system 100 or 200, may implement resource allocation schemes of FIGS. 3 through 8, or any combination thereof. For example, the process flow 1000 may illustrate a UE 115-b receiving an indication from a first serving cell 205-c that a SCell 205-d has been activated (thus becoming a new serving cell of the UE 115-b), receiving a reference signal on the SCell, and activating the SCell 205-d, as described with reference to FIGS. 1-9, among other aspects.

The process flow 1000 may include a UE 115-b, a first serving cell 205-c (e.g. a PCell), and a SCell 205-d, which may be examples of UEs 115 and serving cells 205 as described with reference to FIGS. 1 and 2. In particular, the first serving cell 205-c may include an example of a serving cell 205 at the UE 115-b which is to remain active, and the SCell 205-d may include an example of a serving cell 205 which is to be activated. In some aspects, the first serving cell 205-c and the SCell 205-d may be associated with (e.g., supported by) a single base station 105 of a wireless communications system (e.g., base station 105-a illustrated in FIG. 2). Additionally, or alternatively, the first serving cell 205-c and the SCell 205-d may be associated with (e.g., supported by) different base stations 105.

In some examples, the operations illustrated in process flow 1000 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 1005, the UE 115-b may establish wireless communications with the first serving cell 205-c. In some aspects, the UE 115-b may establish the wireless communications with the first serving cell 205-c by initiating or otherwise performing a setup procedure with the first serving cell 205-c. In some aspects, the first serving cell 205-c and the SCell 205-d may be associated with the same frequency band (e.g., intra-band carrier aggregation), or a different frequency band (e.g., inter-band carrier aggregation). In some cases, the first serving cell 205-c, the SCell 205-d, or both, may be associated with a given radio access technology, such as a 5G radio access technology, an NR access technology, a 4G radio access technology, an LTE radio access technology, or any combination thereof. In some cases, the first serving cell 205-c may be associated with the same or different radio access technology as the radio access technology associated with the SCell 205-d. Moreover, in some cases, the first serving cell 205-c and the SCell 205-d may be associated with different frequency bands associated with a common radio access technology. For example, in some cases, both the cells may be associated with an NR access technology, where the first serving cell 205-c is associated an FR1 frequency band of the NR access technology and the SCell 205-d is associated an FR2 frequency band of the NR access technology.

At 1010, the UE 115-b may receive a DCI message via the first serving cell 205-c. In some aspects, the DCI may include an indication of PDSCH resources usable by the UE 115-*b* to receive a MAC-CE that activates the SCell 205-*d*. The DCI message may be transmitted via PDCCH resources. In some aspects, the UE 115-*b* may receive the DCI message at 1010 based on establishing the wireless communications with the first serving cell 205-*c* at 1005, receiving a control or configuration message (e.g., RRC message, SIB message, SSB message), or any combination thereof.

In some aspects, the DCI message may include an indication that the reference signals (e.g., temporary reference signals) associated with the SCell 205-*d* have been activated (e.g., triggered, initiated). In this regard, the UE 115-*b* may be configured to determine that it may monitor for the reference signals on the SCell 205-*d* based on the indication in the DCI message.

At 1015, the UE 115-*b* may receive, from the base station via the first serving cell 205-*c*, an indication to activate the SCell 205-*d*. In some aspects, the indication to activate the SCell 205-*d* may be indicated via a MAC-CE message. In some aspects, the base station may transmit, and the UE 115-*b* may receive, the indication to activate the SCell 205-*d* based on the DCI message. For example, the DCI message may schedule a PDSCH transmission (e.g., MAC-CE message), where the PDSCH transmission includes the indication to activate the SCell 205-*d*. In cases where the indication to activate the SCell 205-*d* is conveyed via a MAC-CE message, the MAC-CE message may include an indication that the reference signals (e.g., temporary reference signals) associated with the SCell 205-*d* have been activated (e.g., triggered, initiated).

At 1020, the UE 115-*b* may transmit a feedback message to the base station via the first serving cell 205-*c*. In some aspects, the UE 115-*b* may transmit the feedback message to the base station based on (e.g., in response to) receiving the indication to activate the SCell 205-*d*. The feedback message may include an ACK message, a NACK message, or both. For example, in cases where the indication includes an activation of the SCell 205-*d*, the UE 115-*b* may transmit an ACK message in response to the activation of the SCell 205-*d*.

At 1025, the UE 115-*b* may determine one or more temporary reference signal parameters for the SCell 205-*d*. The determination of the temporary reference signal parameters may be made in accordance with various techniques as discussed herein. In some aspects, the UE 115-*b* may determine that the temporary reference signal has been activated based on an implicit determination, based on explicit signaling received from the base station, or both. In particular, the UE 115-*b* may be configured to determine that the reference signals associated with the SCell 205-*d* have been activated based on receiving the DCI message, receiving the indication to activate the SCell (e.g., MAC-CE message), or both.

At 1030, the UE 115-*b* may receive a reference signal from the base station via the SCell 205-*d*. In some aspects, the UE 115-*a* may receive the reference signal in accordance with techniques as discussed herein. The reference signal may include, but is not limited to, a temporary reference signal. For example, the temporary reference signal may include a tracking reference signal, a non-zero power CSI-RS configured as a tracking reference signal, one or more other reference signals, or combinations thereof.

At 1035, the UE 115-*b* may determine and/or adjust AGC associated with the SCell 205-*d*, tracking (e.g., time tracking, frequency tracking) associated with the SCell 205-*d*, or any combination thereof. For example, the reference signals may include an indication of AGC and/or tracking associated with the SCell 205-*d*.

At 1040, the UE 115-*b* may conduct the wireless communications with the first serving cell 205-*c* and the SCell 205-*d*. For example, such communications may be based at least in part on the determined and/or adjusted AGC associated with the SCell 205-*d*, tracking (e.g., time tracking, frequency tracking) associated with the SCell 205-*d*, or any combination thereof.

Figure 11:
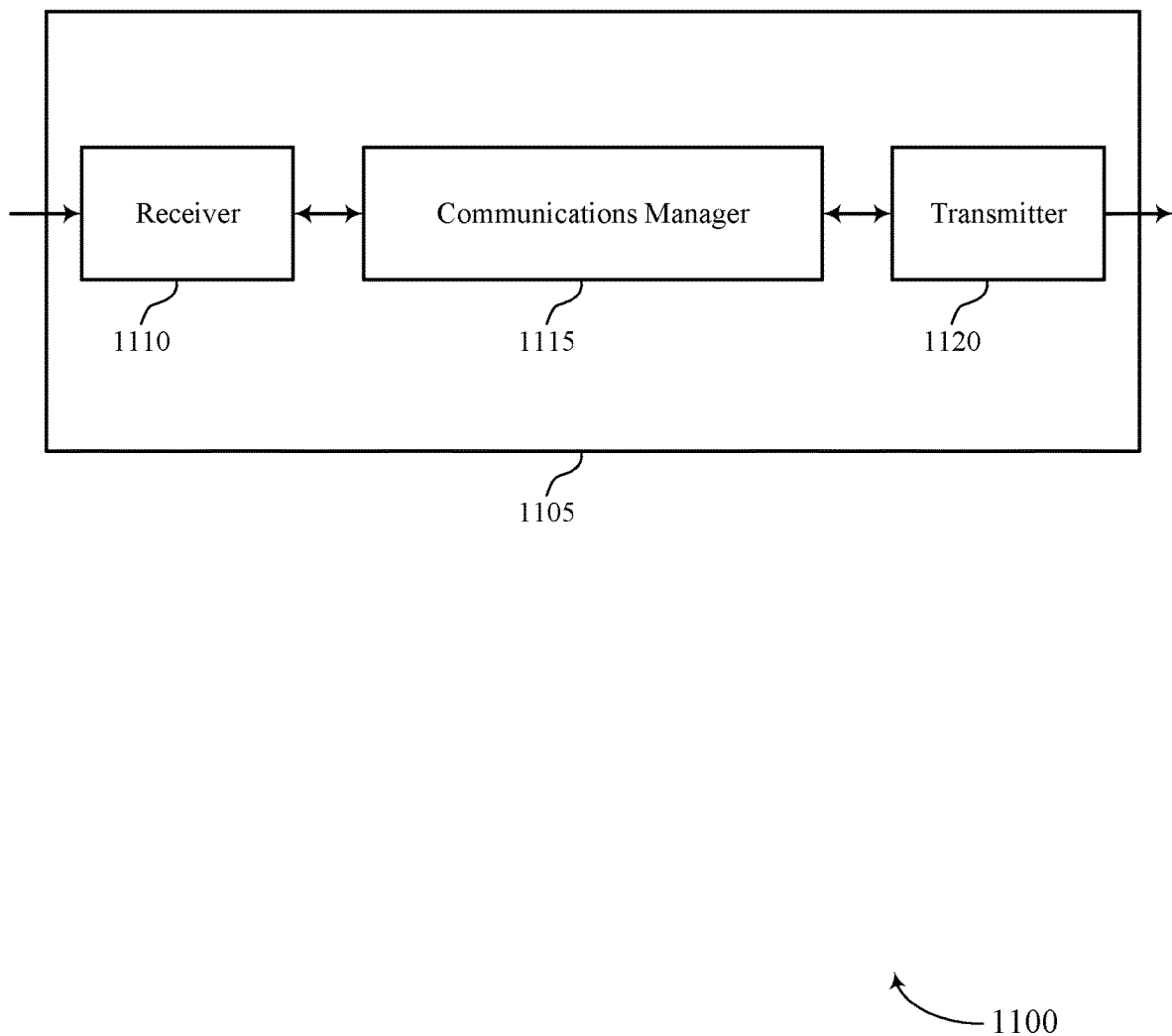
FIGS. 11 and 12 show block diagrams of devices that support reference signal configuration for secondary cell activation in accordance with aspects of the present disclosure.

FIG. 11 shows a block diagram 1100 of a device 1105 that supports reference signal configuration for SCell activation in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to reference signal configuration for SCell activation). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from a base station, a SCell activation message that indicates a SCell is to be activated at the UE in addition to a primary cell, identify, based on the SCell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and measure one or more characteristics of the SCell based on the aperiodic reference signal. The communications manager 1115 may be an example of aspects of the communications manager 1410 described herein.

The communications manager 1115, or its sub-components, may be implemented in hardware, code (e.g., software) executed by a processor, or any combination thereof. If implemented in code executed by a processor, the functions of the communications manager 1115, or its sub-components may be executed by a general-purpose processor, a central processing unit (CPU), a graphics processing unit (GPU), a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
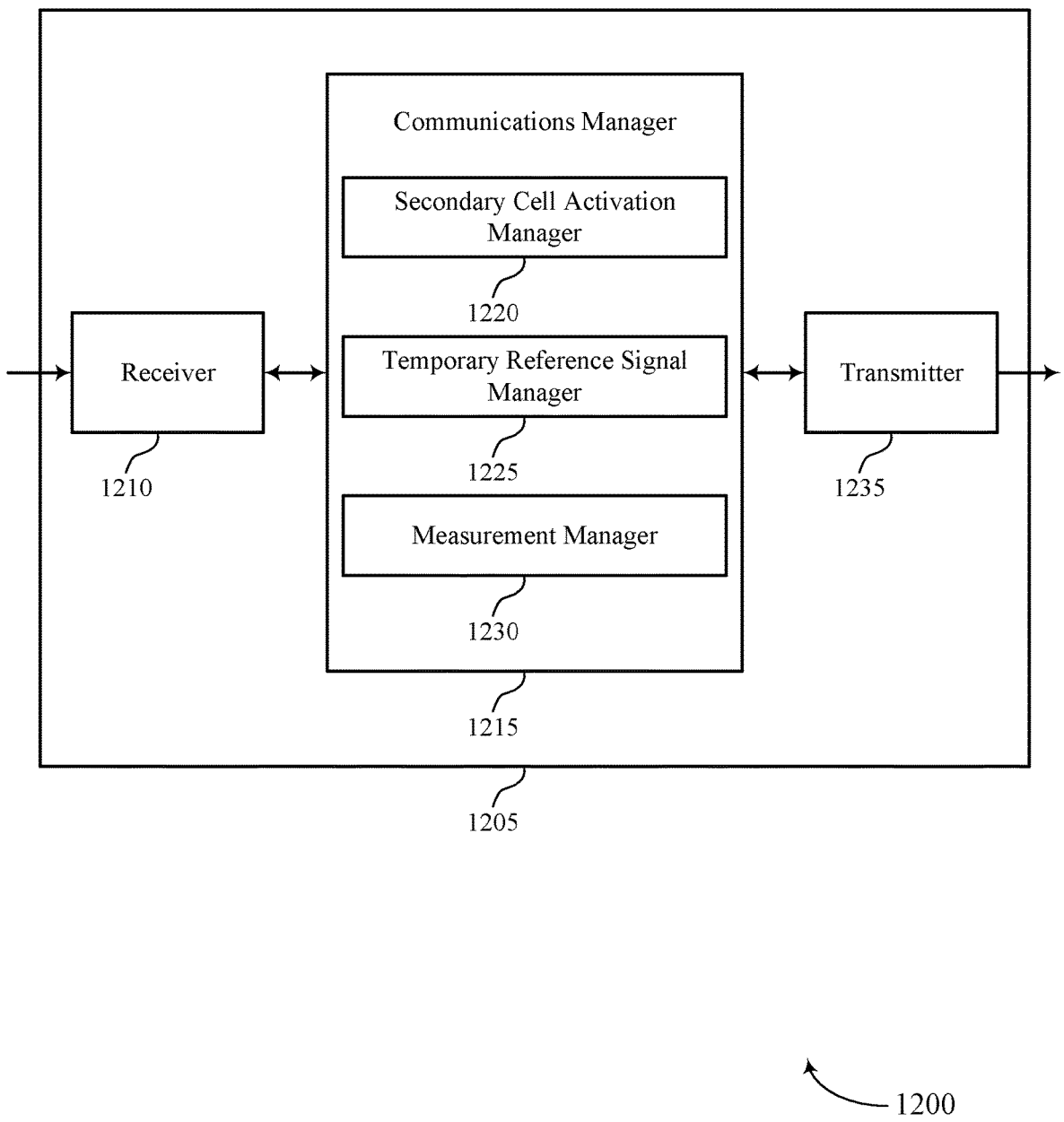

FIG. 12 shows a block diagram 1200 of a device 1205 that supports reference signal configuration for SCell activation in accordance with aspects of the present disclosure. The device 1205 may be an example of aspects of a device 1105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to reference signal configuration for SCell activation). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a SCell activation manager 1220, a temporary reference signal manager 1225, and a measurement manager 1230. The communications manager 1215 may be an example of aspects of the communications manager 1410 described herein.

The SCell activation manager 1220 may receive, from a base station, a SCell activation message that indicates a SCell is to be activated at the UE in addition to a primary cell.

The temporary reference signal manager 1225 may identify, based on the SCell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof.

The measurement manager 1230 may measure one or more characteristics of the SCell based on the aperiodic reference signal.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
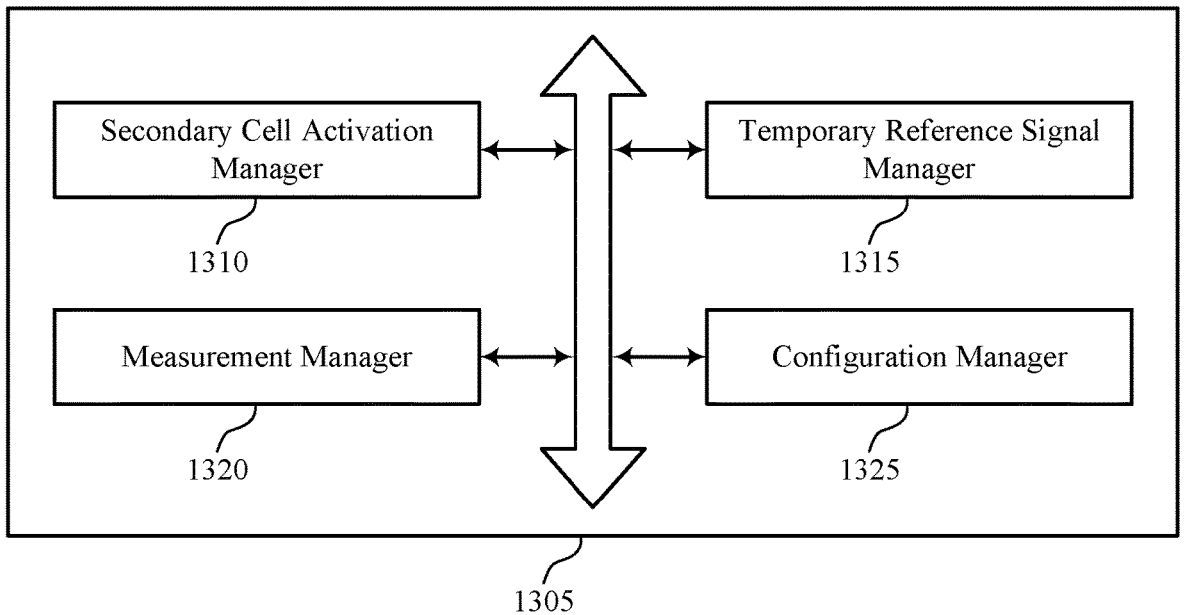
FIG. 13 shows a block diagram of a communications manager that supports reference signal configuration for secondary cell activation in accordance with aspects of the present disclosure.

FIG. 13 shows a block diagram 1300 of a communications manager 1305 that supports reference signal configuration for SCell activation in accordance with aspects of the present disclosure. The communications manager 1305 may be an example of aspects of a communications manager 1115, a communications manager 1215, or a communications manager 1410 described herein. The communications manager 1305 may include a SCell activation manager 1310, a temporary reference signal manager 1315, a measurement manager 1320, and a configuration manager 1325. Each of these modules may communicate, directly or indirectly, with one another (e.g., via one or more buses).

The SCell activation manager 1310 may receive, from a base station, a SCell activation message that indicates a SCell is to be activated at the UE in addition to a primary cell. In some examples, the SCell activation manager 1310 may receive, from the base station, DCI that indicates the one or more parameters for the aperiodic reference signal. In some examples, the SCell activation manager 1310 may receive, subsequent to receiving the MAC-CE, a DCI transmission from the base station that disables the aperiodic reference signal.

In some cases, the DCI schedules a shared channel communication that provides the SCell activation message and indicates the one or more parameters for the aperiodic reference signal. In some cases, the DCI is a separate DCI from a scheduling DCI that schedules a shared channel communication that provides the SCell activation message. In some cases, the separate DCI includes other scheduling information for downlink shared channel communications with the UE, and the one or more parameters for the aperiodic reference signal. In some cases, the DCI has a fallback DCI format or a non-fallback DCI format.

In some cases, a first MAC-CE provides the one or more parameters for the aperiodic reference signal and a second MAC-CE provides the SCell activation message. In some cases, the first MAC-CE and the second MAC-CE are in a same downlink shared channel communication, or are in different downlink shared channel communications, from the base station. In some cases, the MAC-CE includes a first field that indicates the SCell that is to be activated and a second field that indicates the one or more parameters for the aperiodic reference signal for the SCell that is to be activated. In some cases, the one or more parameters for the aperiodic reference signal are implicitly indicated by a MAC-CE that carries the SCell activation message.

The temporary reference signal manager 1315 may identify, based on the SCell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof.

In some examples, the temporary reference signal manager 1315 may receive, from the base station, a MAC-CE that indicates the one or more parameters for the aperiodic reference signal. In some cases, the aperiodic reference signal is transmitted after a time gap associated with the SCell activation message. In some cases, the time gap corresponds to a first predetermined time period after an acknowledgment of the SCell activation message by the UE, a second predetermined time period after a downlink control channel communication that provides the DCI, or a third predetermined time period after an acknowledgment of the DCI by the UE.

In some cases, the one or more parameters for the aperiodic reference signal are provided in an information field in the DCI, and where the information field has a same format as a CSI request field that is transmitted in DCI. In some cases, the separate DCI is included with a downlink control channel communication that does not provide scheduling information for shared channel communications. In some cases, the one or more parameters for the aperiodic reference signal are provided in one or more fields in the separate DCI that are otherwise used for the scheduling information for shared channel communications. In some cases, the one or more parameters for the aperiodic reference signal are provided in an information field having a same format as a CSI request field in an uplink grant.

In some cases, a number of bits in the information field is configured by RRC signaling or is determined based on a number of available tracking reference signal (TRS) states. In some cases, the information field is mapped to one or more of a TRS timing or slot, a TRS resource, a TRS power offset, or any combinations thereof, for one or multiple serving cells. In some cases, the one or more parameters for the aperiodic reference signal are provided in one or more of a FDRA field, a TDRA field, or any combinations thereof.

In some cases, the MAC-CE that provides the one or more parameters for the aperiodic reference signal also provides the SCell activation message. In some cases, the MAC-CE includes a field that carries an indication of the one or more parameters for the aperiodic reference signal for two or more SCells. In some cases, the MAC-CE includes a first field that indicates a carrier of the aperiodic reference signal, and a second field that indicates one or more other parameters for the aperiodic reference signal.

In some cases, the aperiodic reference signal is enabled if a shared channel communication carrying the MAC-CE is scheduled by a preconfigured DCI format. In some cases, the aperiodic reference signal is enabled if a shared channel communication carrying the MAC-CE is scheduled by a DCI transmission in a DCI search space set that is configured by RRC signaling.

The measurement manager 1320 may measure one or more characteristics of the SCell based on the aperiodic reference signal. In some examples, the measurement manager 1320 may measurements of the aperiodic reference signal are triggered by the DCI having a preconfigured DCI format. In some cases, the DCI indicates that the UE is not to measure the aperiodic reference signal, and where the measuring of the one or more characteristics the SCell is based on one or more channel measurements of a synchronization signal block (SSB) associated with the SCell.

The configuration manager 1325 may receive, from the base station, one or more of DCI or a MAC-CE that includes information associated with the aperiodic reference signal. In some examples, the configuration manager 1325 may determine, based on the DCI, the MAC control element, implicit signaling, or combinations thereof, the one or more parameters for the aperiodic reference signal. In some examples, measurements of the aperiodic reference signal are triggered by the DCI located in a preconfigured DCI search space set. In some cases, the one or more parameters for the aperiodic reference signal include one or more of the carrier for the aperiodic reference signal, the slot location of the aperiodic reference signal, a mapping of resources of the aperiodic reference signal, a power offset of the aperiodic reference signal relative to a downlink shared channel or SSB transmission, a QCL assumption for a beam of the aperiodic reference signal, a TCI state of the aperiodic reference signal, or any combinations thereof. In some cases, the preconfigured DCI format is configured by RRC signaling. In some cases, one or more preconfigured DCI search space sets that can contain DCI that triggers measurement of the aperiodic reference signal are configured by RRC signaling. In some cases, the one or more parameters for the aperiodic reference signal are preconfigured at the UE by higher layer signaling.

Figure 14:
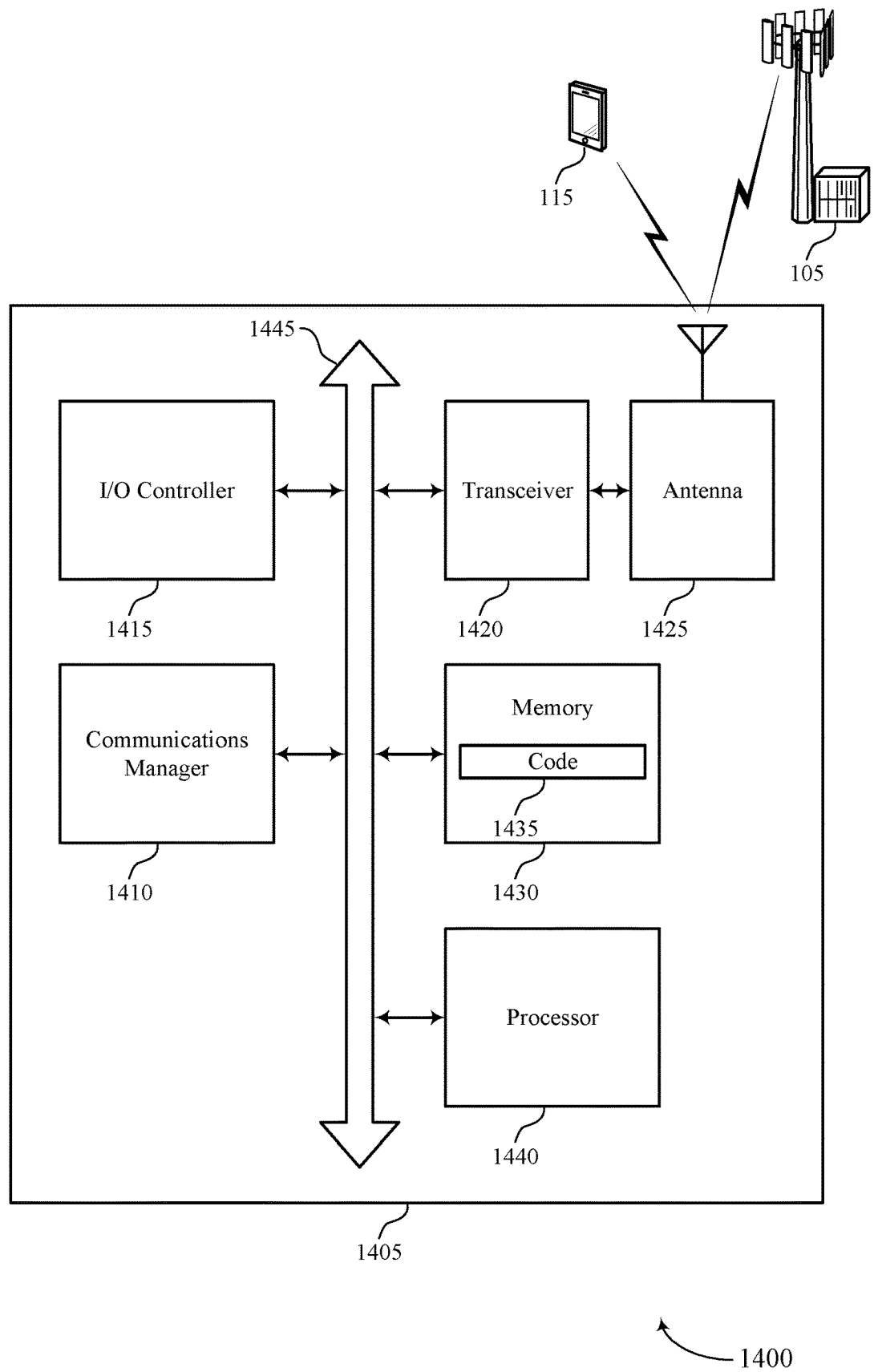
FIG. 14 shows a diagram of a system including a device that supports reference signal configuration for secondary cell activation in accordance with aspects of the present disclosure.

FIG. 14 shows a diagram of a system 1400 including a device 1405 that supports reference signal configuration for SCell activation in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may receive, from a base station, a SCell activation message that indicates a SCell is to be activated at the UE in addition to a primary cell, identify, based on the SCell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and measure one or more characteristics of the SCell based on the aperiodic reference signal.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting reference signal configuration for SCell activation).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
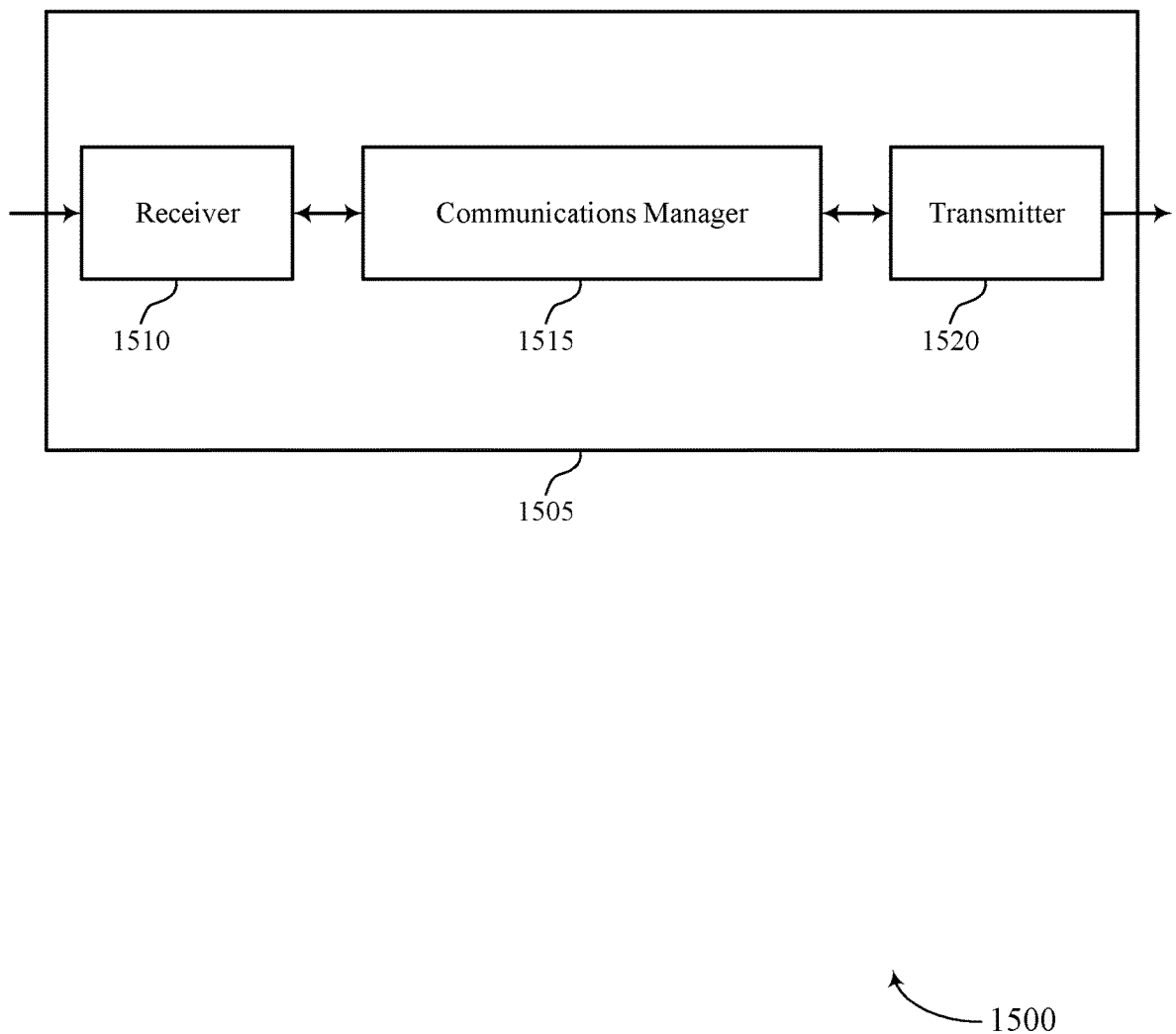
FIGS. 15 and 16 show block diagrams of devices that support reference signal configuration for secondary cell activation in accordance with aspects of the present disclosure.

FIG. 15 shows a block diagram 1500 of a device 1505 that supports reference signal configuration for SCell activation in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to reference signal configuration for SCell activation). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may transmit, to a UE, a SCell activation message that indicates a SCell is to be activated at the UE in addition to a primary cell, identify, based on the SCell activation message, one or more parameters for an aperiodic reference signal of the SCell, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and transmit the aperiodic reference signal to the UE based on the identifying. The communications manager 1515 may be an example of aspects of the communications manager 1810 described herein.

The communications manager 1515, or its sub-components, may be implemented in hardware, code (e.g., software) executed by a processor, or any combination thereof. If implemented in code executed by a processor, the functions of the communications manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
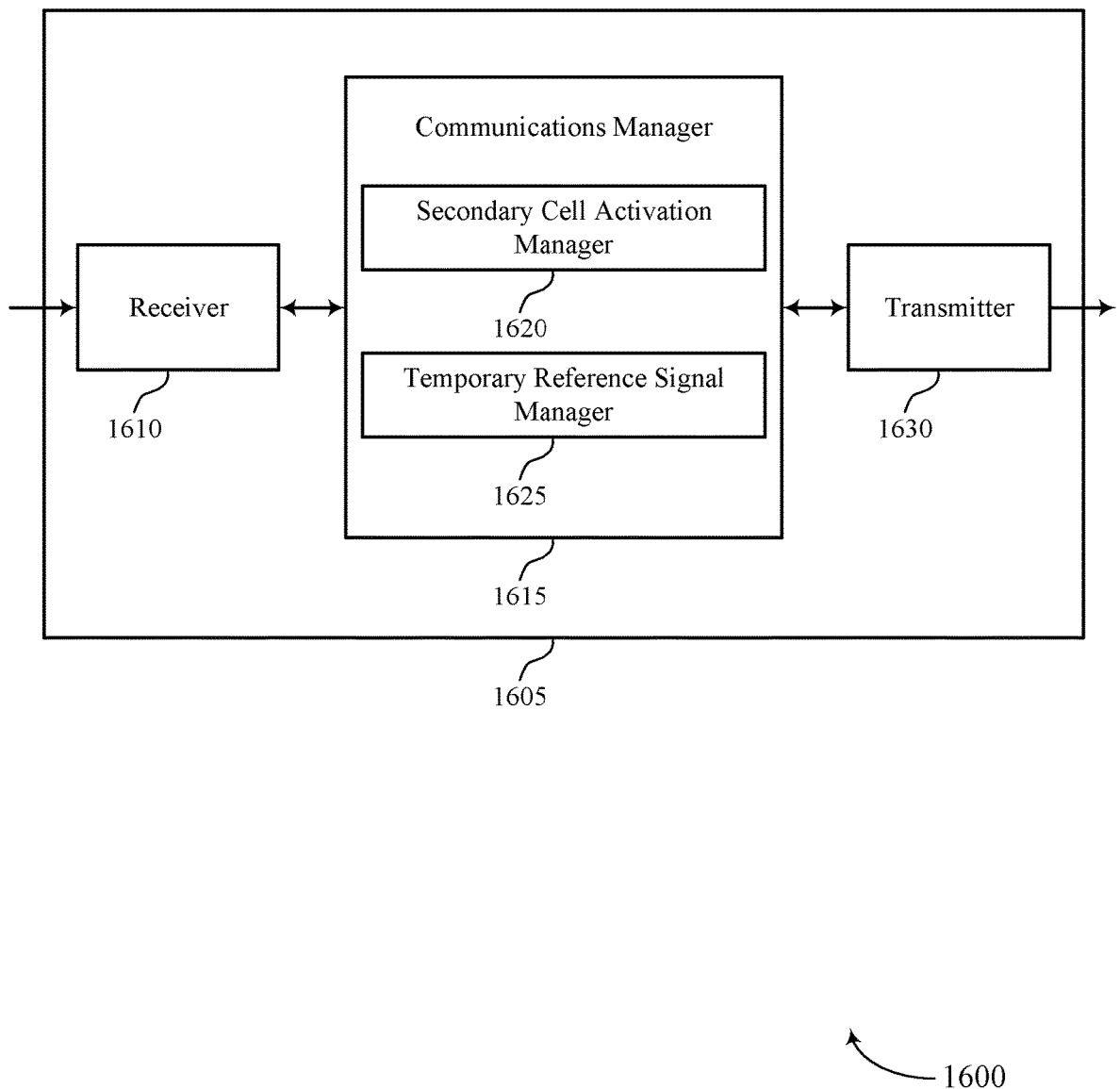

FIG. 16 shows a block diagram 1600 of a device 1605 that supports reference signal configuration for SCell activation in accordance with aspects of the present disclosure. The device 1605 may be an example of aspects of a device 1505, or a base station 105 as described herein. The device 1605 may include a receiver 1610, a communications manager 1615, and a transmitter 1630. The device 1605 may also include a processor. Each of these components may be in communication with one another (e.g., via one or more buses).

The receiver 1610 may receive information such as packets, user data, or control information associated with various information channels (e.g., control channels, data channels, and information related to reference signal configuration for SCell activation). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a SCell activation manager 1620 and a temporary reference signal manager 1625. The communications manager 1615 may be an example of aspects of the communications manager 1810 described herein.

The SCell activation manager 1620 may transmit, to a UE, a SCell activation message that indicates a SCell is to be activated at the UE in addition to a primary cell.

The temporary reference signal manager 1625 may identify, based on the SCell activation message, one or more parameters for an aperiodic reference signal of the SCell, where the one or more parameters include a carrier for the aperiodic reference signal, a slot location of the aperiodic reference signal, a reference signal configuration of the aperiodic reference signal, a beam configuration for the aperiodic reference signal, or any combinations thereof and transmit the aperiodic reference signal to the UE based on the identifying.

The transmitter 1630 may transmit signals generated by other components of the device 1605. In some examples, the transmitter 1630 may be collocated with a receiver 1610 in a transceiver module. For example, the transmitter 1630 may be an example of aspects of the transceiver 1820 described with reference to FIG. 18. The transmitter 1630 may utilize a single antenna or a set of antennas.

Figure 17:
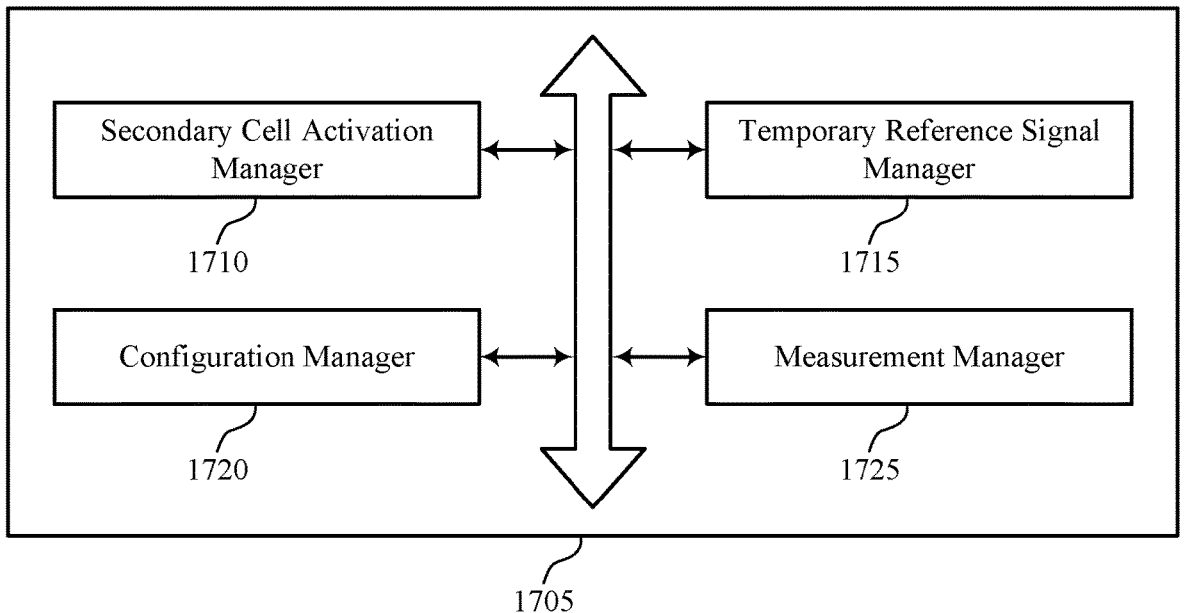
FIG. 17 shows a block diagram of a communications manager that supports reference signal configuration for secondary cell activation in accordance with aspects of the present disclosure.

FIG. 17 shows a block diagram 1700 of a communications manager 1705 that supports reference signal configuration for SCell activation in accordance with aspects of the present disclosure. The communications manager 1705 may be an example of aspects of a communications manager 1515, a communications manager 1615, or a communications manager 1810 described herein. The communications manager 1705 may include a SCell activation manager 1710, a temporary reference signal manager 1715, a configuration manager 1720, and a measurement manager 1725. Each of these modules may communicate, directly or indirectly, with one another (e.g., via one or more buses).

The SCell activation manager 1710 may transmit, to a UE, a SCell activation message that indicates a SCell is to be activated at the UE in addition to a primary cell. In some examples, the SCell activation manager 1710 may transmit, subsequent to transmitting the MAC-CE, a DCI transmission to the UE that disables the aperiodic reference signal.

In some cases, the DCI schedules a shared channel communication that provides the SCell activation message and indicates the one or more parameters for the aperiodic reference signal. In some cases, the DCI is a separate DCI from a scheduling DCI that schedules a shared channel communication that provides the SCell activation message. In some cases, the separate DCI includes other scheduling information for downlink shared channel communications with the UE, and the one or more parameters for the aperiodic reference signal. In some cases, the separate DCI is included with a downlink control channel communication that does not provide scheduling information for shared channel communications. In some cases, the one or more parameters for the aperiodic reference signal are provided in one or more fields in the separate DCI that are otherwise used for the scheduling information for shared channel communications. In some cases, the DCI has a fallback DCI format or a non-fallback DCI format.

In some cases, a first MAC-CE provides the one or more parameters for the aperiodic reference signal and a second MAC-CE provides the SCell activation message. In some cases, the first MAC-CE and the second MAC-CE are in a same downlink shared channel communication, or are in different downlink shared channel communications, from the base station. In some cases, the MAC-CE includes a first field that indicates the SCell that is to be activated and a second field that indicates the one or more parameters for the aperiodic reference signal for the SCell that is to be activated. In some cases, the aperiodic reference signal is enabled if a shared channel communication carrying the MAC-CE is scheduled by a preconfigured DCI format. In some cases, the one or more parameters for the aperiodic reference signal are implicitly indicated by a MAC-CE that carries the SCell activation message.

The temporary reference signal manager 1715 may identify, based on the SCell activation message, one or more parameters for an aperiodic reference signal of the SCell, where the one or more parameters include a carrier for the aperiodic reference signal, a slot location of the aperiodic reference signal, a reference signal configuration of the aperiodic reference signal, a beam configuration for the aperiodic reference signal, or any combinations thereof. In some examples, the temporary reference signal manager 1715 may transmit the aperiodic reference signal to the UE based on the identifying.

In some examples, the temporary reference signal manager 1715 may transmit, to the UE, one or more of DCI or a MAC-CE that includes information associated with the aperiodic reference signal, and where the one or more parameters for the aperiodic reference signal are indicated by the DCI, the MAC-CE, an implicit indication, or any combinations thereof. In some examples, the temporary reference signal manager 1715 may transmit, to the UE, a MAC-CE that indicates the one or more parameters for the aperiodic reference signal.

In some cases, the one or more parameters for the aperiodic reference signal include one or more of the carrier for the aperiodic reference signal, the slot location of the aperiodic reference signal, a mapping of resources of the aperiodic reference signal, a power offset of the aperiodic reference signal relative to a downlink shared channel or SSB transmission, a QCL assumption for a beam of the aperiodic reference signal, a TCI state of the aperiodic reference signal, or any combinations thereof. In some cases, the aperiodic reference signal is transmitted after a time gap associated with the SCell activation message. In some cases, the time gap corresponds to a first predetermined time period after an acknowledgment of the SCell activation message by the UE, a second predetermined time period after a downlink control channel communication that provides the DCI, or a third predetermined time period after an acknowledgment of the DCI by the UE.

In some cases, the one or more parameters for the aperiodic reference signal are provided in an information field in the DCI, and where the information field has a same format as a CSI request field that is transmitted in DCI. In some cases, the one or more parameters for the aperiodic reference signal are provided in one or more of a FDRA field, a TDRA field, or any combinations thereof. In some cases, the DCI indicates that the UE is not to measure the aperiodic reference signal, and where the UE measures one or more characteristics of the SCell is based on one or more channel measurements of a SSB associated with the SCell.

In some cases, the MAC-CE that provides the one or more parameters for the aperiodic reference signal also provides the SCell activation message. In some cases, the MAC-CE includes a field that carries an indication of the one or more parameters for the aperiodic reference signal for two or more SCells. In some cases, the MAC-CE includes a first field that indicates a carrier of the aperiodic reference signal, and a second field that indicates one or more other parameters for the aperiodic reference signal. In some cases, the aperiodic reference signal is enabled if a shared channel communication carrying the MAC-CE is scheduled by a DCI transmission in a DCI search space set that is configured by RRC signaling.

The configuration manager 1720 may transmit, to the UE, DCI that indicates the one or more parameters for the aperiodic reference signal. In some cases, the one or more parameters for the aperiodic reference signal are provided in an information field having a same format as a CSI request field in an uplink grant. In some cases, a number of bits in the information field is configured by RRC signaling or is determined based on a number of available tracking reference signal (TRS) states. In some cases, the information field is mapped to one or more of a TRS timing or slot, a TRS resource, a TRS power offset, or any combinations thereof, for one or multiple serving cells. In some cases, the preconfigured DCI format is configured by RRC signaling. In some cases, one or more preconfigured DCI search space sets that can contain DCI that triggers measurement of the aperiodic reference signal are configured by RRC signaling. In some cases, the one or more parameters for the aperiodic reference signal are preconfigured at the UE by higher layer signaling.

The measurement manager 1725 may measurements of the aperiodic reference signal are triggered by the DCI having a preconfigured DCI format. In some examples, measurements of the aperiodic reference signal are triggered by the DCI located in a preconfigured DCI search space set.

Figure 18:
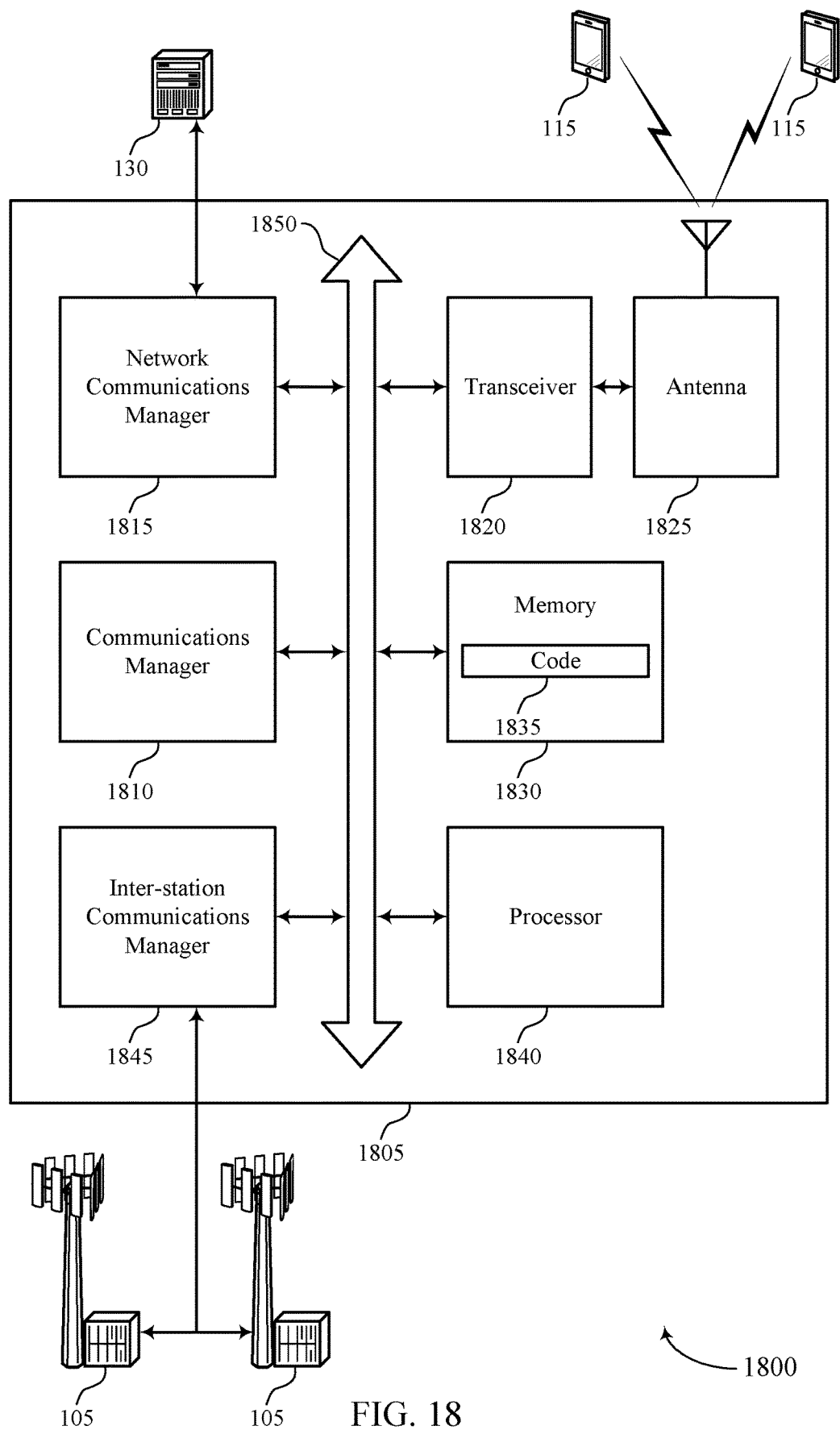
FIG. 18 shows a diagram of a system including a device that supports reference signal configuration for secondary cell activation in accordance with aspects of the present disclosure.

FIG. 18 shows a diagram of a system 1800 including a device 1805 that supports reference signal configuration for SCell activation in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may transmit, to a UE, a SCell activation message that indicates a SCell is to be activated at the UE in addition to a primary cell, identify, based on the SCell activation message, one or more parameters for an aperiodic reference signal of the SCell, where the one or more parameters include a carrier for the aperiodic reference signal, a slot location of the aperiodic reference signal, a reference signal configuration of the aperiodic reference signal, a beam configuration for the aperiodic reference signal, or any combinations thereof, and transmit the aperiodic reference signal to the UE based on the identifying.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting reference signal configuration for SCell activation).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
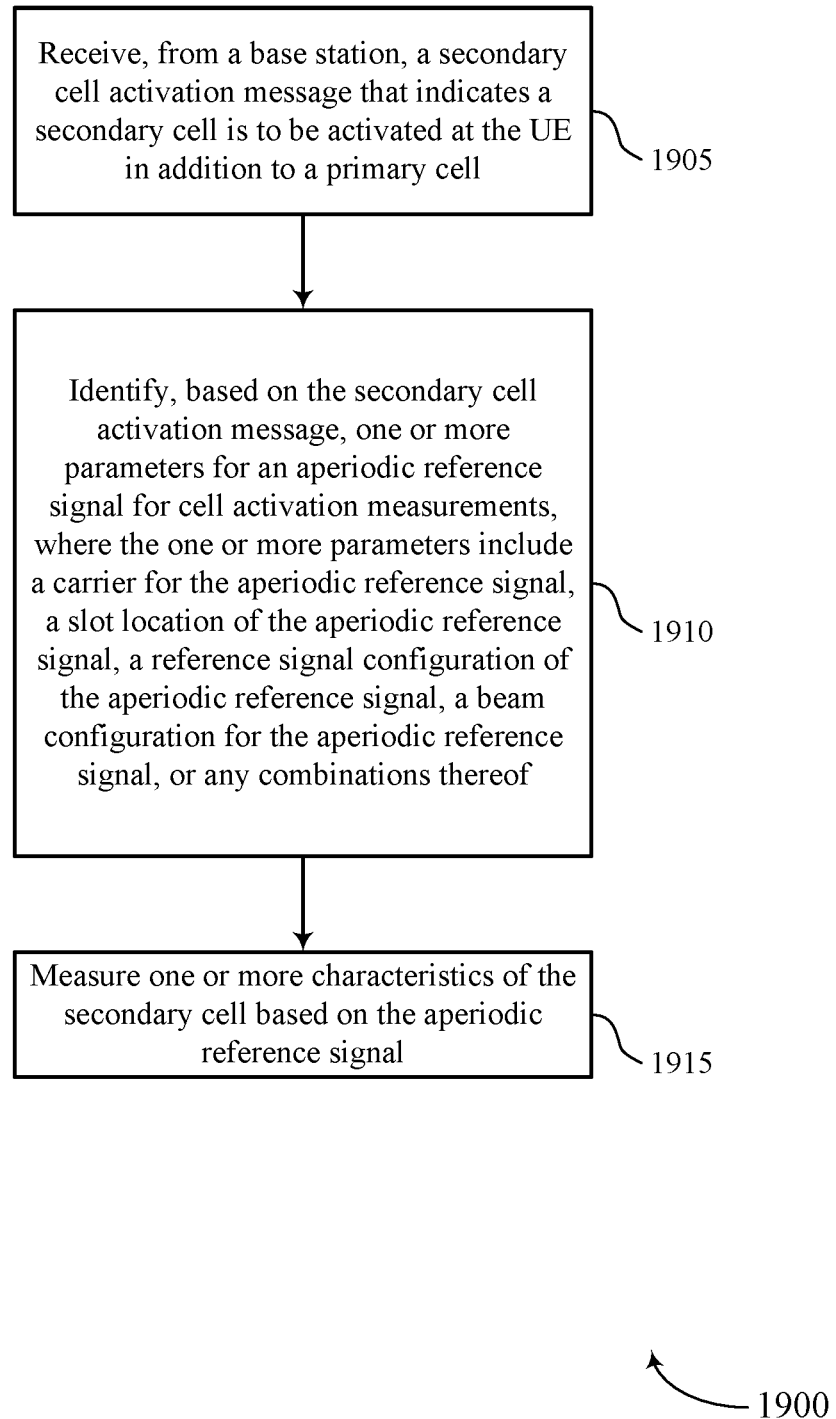
FIGS. 19 through 27 show flowcharts illustrating methods that support reference signal configuration for secondary cell activation in accordance with aspects of the present disclosure.

FIG. 19 shows a flowchart illustrating a method 1900 that supports reference signal configuration for SCell activation in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 1905, the UE may receive, from a base station, a SCell activation message that indicates a SCell is to be activated at the UE in addition to a primary cell. The operations of 1905 may be performed according to the methods described herein. In some examples, aspects of the operations of 1905 may be performed by a SCell activation manager as described with reference to FIGS. 11 through 14.

At 1910, the UE may identify, based on the SCell activation message, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof. The operations of 1910 may be performed according to the methods described herein. In some examples, aspects of the operations of 1910 may be performed by a temporary reference signal manager as described with reference to FIGS. 11 through 14.

At 1915, the UE may measure one or more characteristics of the SCell based on the aperiodic reference signal. The operations of 1915 may be performed according to the methods described herein. In some examples, aspects of the operations of 1915 may be performed by a measurement manager as described with reference to FIGS. 11 through 14.

Figure 20:
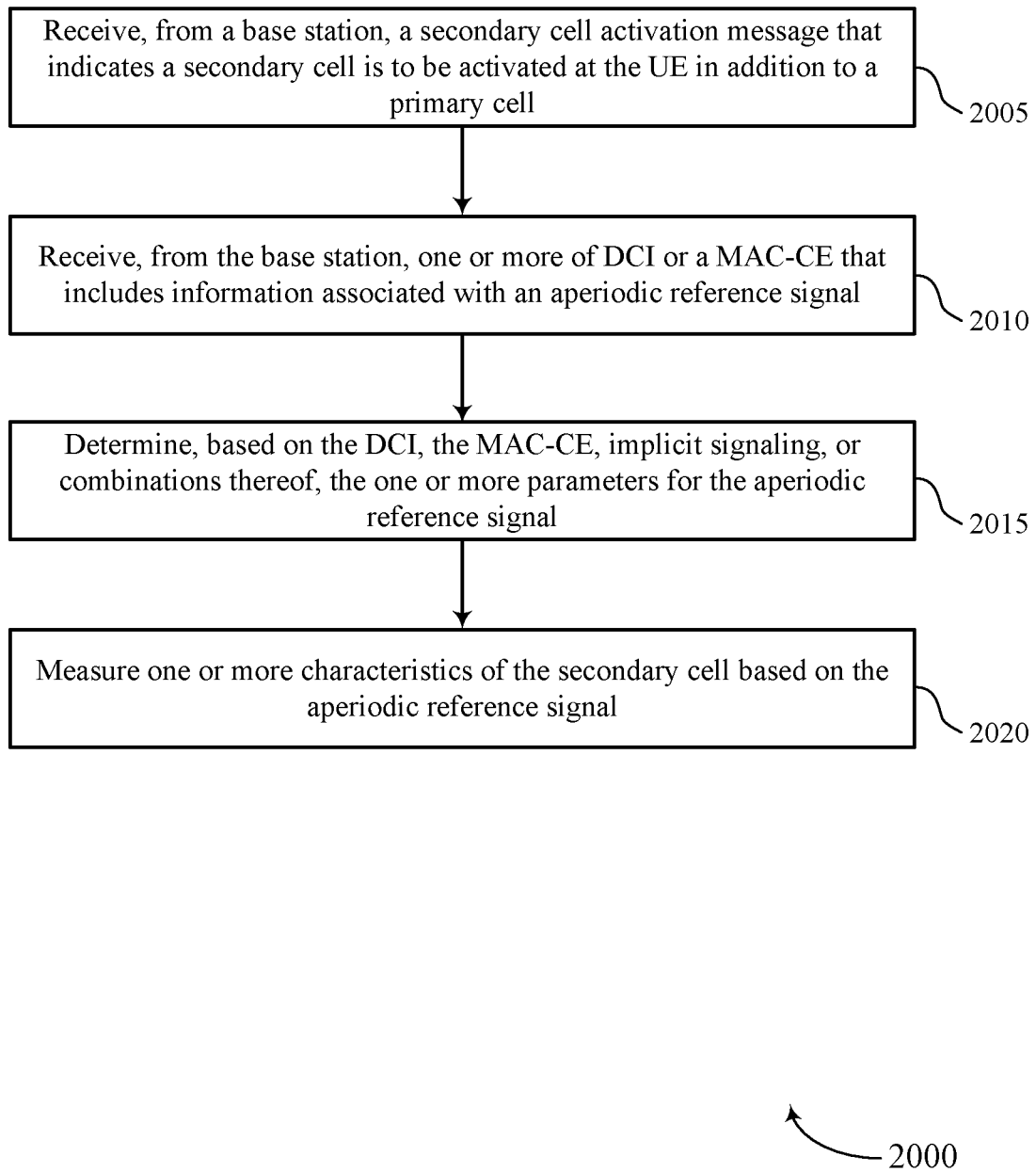

FIG. 20 shows a flowchart illustrating a method 2000 that supports reference signal configuration for SCell activation in accordance with aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2005, the UE may receive, from a base station, a SCell activation message that indicates a SCell is to be activated at the UE in addition to a primary cell. The operations of 2005 may be performed according to the methods described herein. In some examples, aspects of the operations of 2005 may be performed by a SCell activation manager as described with reference to FIGS. 11 through 14.

At 2010, the UE may receive, from the base station, one or more of DCI or a MAC-CE that includes information associated with an aperiodic reference signal. The operations of 2010 may be performed according to the methods described herein. In some examples, aspects of the operations of 2010 may be performed by a configuration manager as described with reference to FIGS. 11 through 14.

At 2015, the UE may determine, based on the DCI, the MAC-CE, implicit signaling, or combinations thereof, the one or more parameters for the aperiodic reference signal. The operations of 2015 may be performed according to the methods described herein. In some examples, aspects of the operations of 2015 may be performed by a configuration manager as described with reference to FIGS. 11 through 14. In some cases, the one or more parameters for the aperiodic reference signal include one or more of the carrier for the aperiodic reference signal, the slot location of the aperiodic reference signal, a mapping of resources of the aperiodic reference signal, a power offset of the aperiodic reference signal relative to a downlink shared channel or synchronization signal block transmission, a QCL assumption for a beam of the aperiodic reference signal, a TCI state of the aperiodic reference signal, or any combinations thereof.

At 2020, the UE may measure one or more characteristics of the SCell based on the aperiodic reference signal. The operations of 2020 may be performed according to the methods described herein. In some examples, aspects of the operations of 2020 may be performed by a measurement manager as described with reference to FIGS. 11 through 14.

Figure 21:
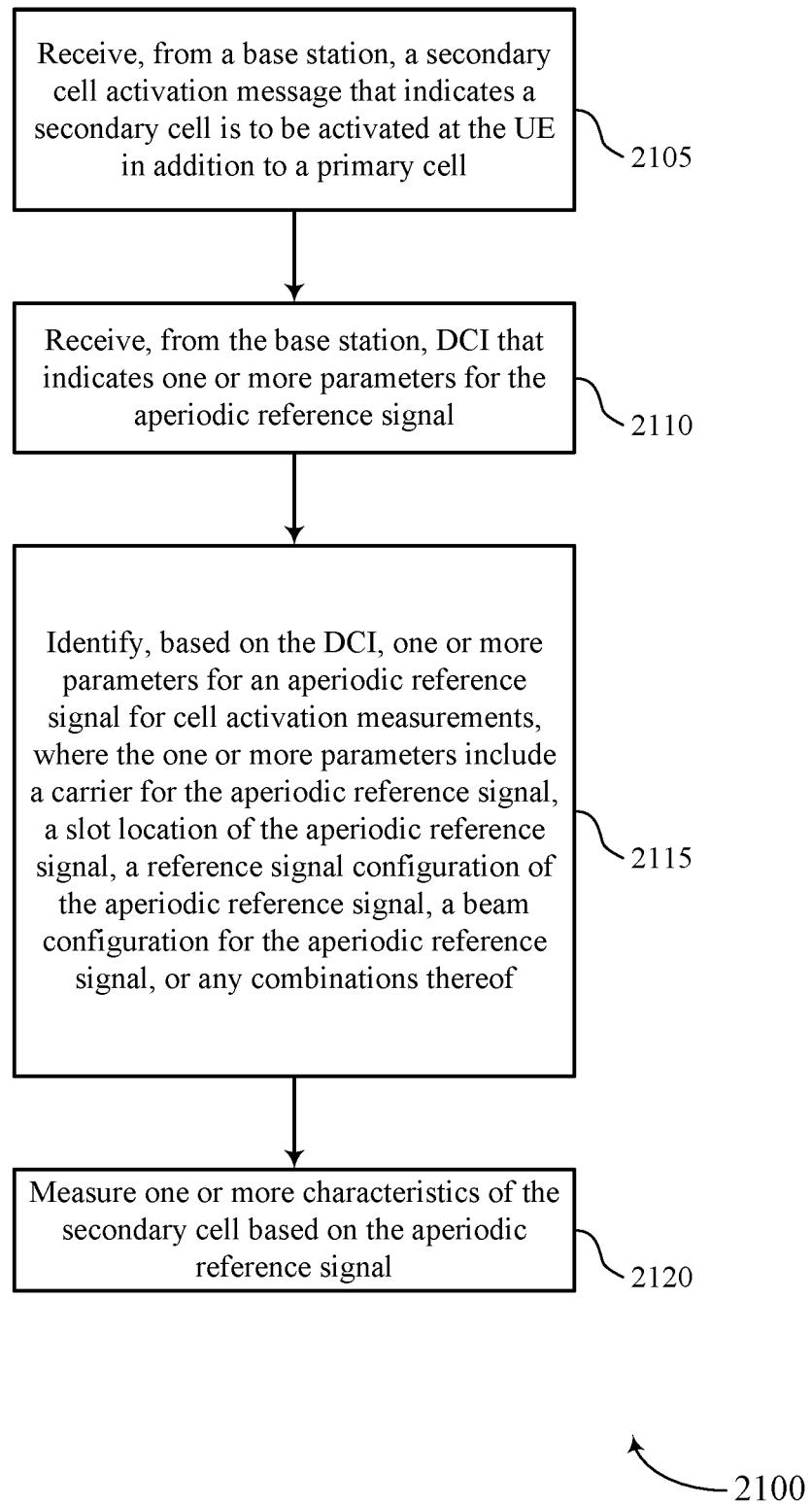

FIG. 21 shows a flowchart illustrating a method 2100 that supports reference signal configuration for SCell activation in accordance with aspects of the present disclosure. The operations of method 2100 may be implemented by a UE 115 or its components as described herein. For example, the operations of method 2100 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2105, the UE may receive, from a base station, a SCell activation message that indicates a SCell is to be activated at the UE in addition to a primary cell. The operations of 2105 may be performed according to the methods described herein. In some examples, aspects of the operations of 2105 may be performed by a SCell activation manager as described with reference to FIGS. 11 through 14.

At 2110, the UE may receive, from the base station, DCI that indicates one or more parameters for the aperiodic reference signal. The operations of 2110 may be performed according to the methods described herein. In some examples, aspects of the operations of 2110 may be performed by a SCell activation manager as described with reference to FIGS. 11 through 14.

At 2115, the UE may identify, based on the DCI, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof. The operations of 2115 may be performed according to the methods described herein. In some examples, aspects of the operations of 2115 may be performed by a temporary reference signal manager as described with reference to FIGS. 11 through 14.

At 2120, the UE may measure one or more characteristics of the SCell based on the aperiodic reference signal. The operations of 2120 may be performed according to the methods described herein. In some examples, aspects of the operations of 2120 may be performed by a measurement manager as described with reference to FIGS. 11 through 14.

Figure 22:
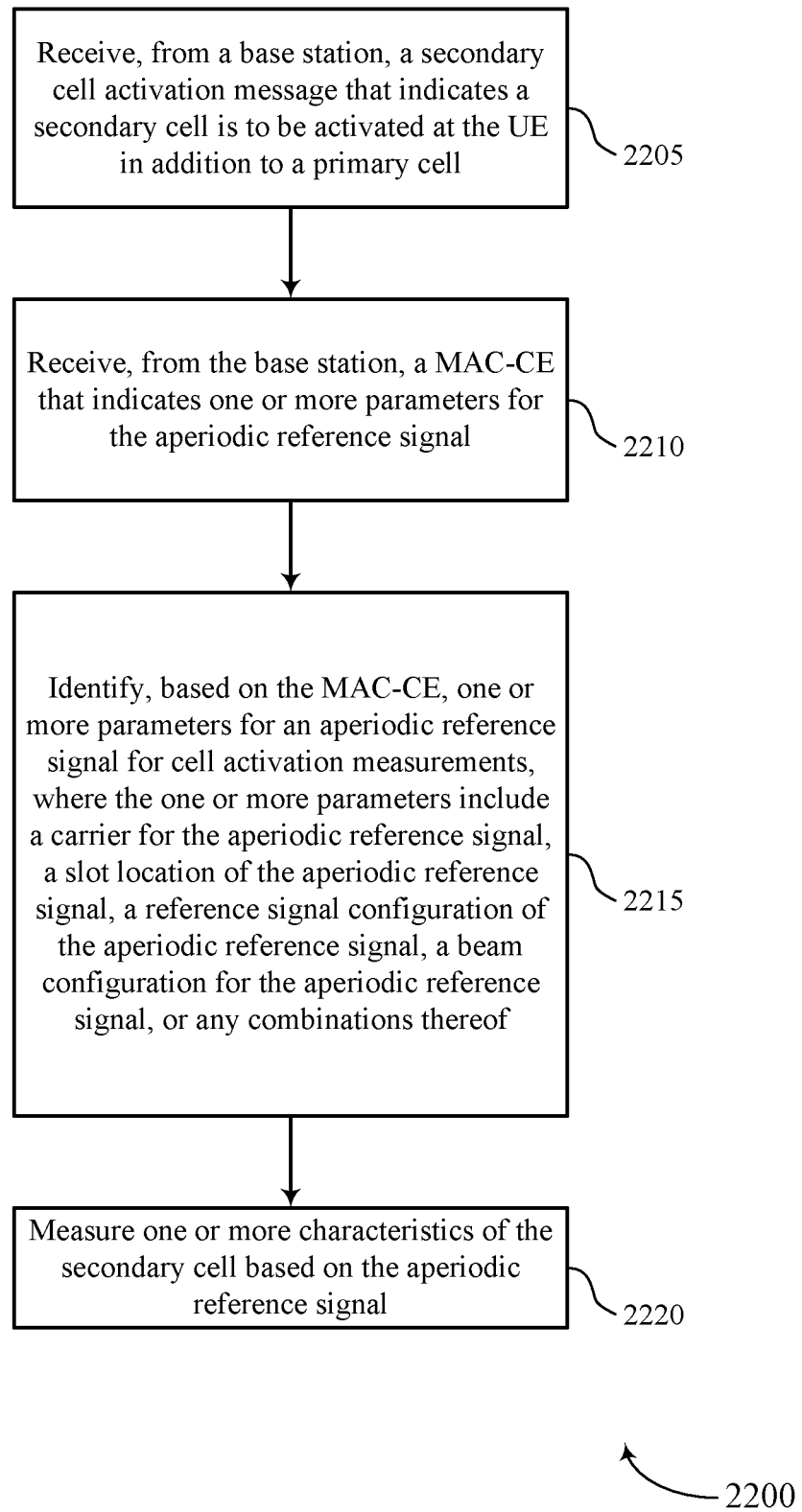

FIG. 22 shows a flowchart illustrating a method 2200 that supports reference signal configuration for SCell activation in accordance with aspects of the present disclosure. The operations of method 2200 may be implemented by a UE 115 or its components as described herein. For example, the operations of method 2200 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2205, the UE may receive, from a base station, a SCell activation message that indicates a SCell is to be activated at the UE in addition to a primary cell. The operations of 2205 may be performed according to the methods described herein. In some examples, aspects of the operations of 2205 may be performed by a SCell activation manager as described with reference to FIGS. 11 through 14.

At 2210, the UE may receive, from the base station, a MAC-CE that indicates one or more parameters for the aperiodic reference signal. The operations of 2210 may be performed according to the methods described herein. In some examples, aspects of the operations of 2210 may be performed by a temporary reference signal manager as described with reference to FIGS. 11 through 14.

At 2215, the UE may identify, based on the MAC-CE, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof. The operations of 2215 may be performed according to the methods described herein. In some examples, aspects of the operations of 2215 may be performed by a temporary reference signal manager as described with reference to FIGS. 11 through 14.

At 2220, the UE may measure one or more characteristics of the SCell based on the aperiodic reference signal. The operations of 2220 may be performed according to the methods described herein. In some examples, aspects of the operations of 2220 may be performed by a measurement manager as described with reference to FIGS. 11 through 14.

Figure 23:
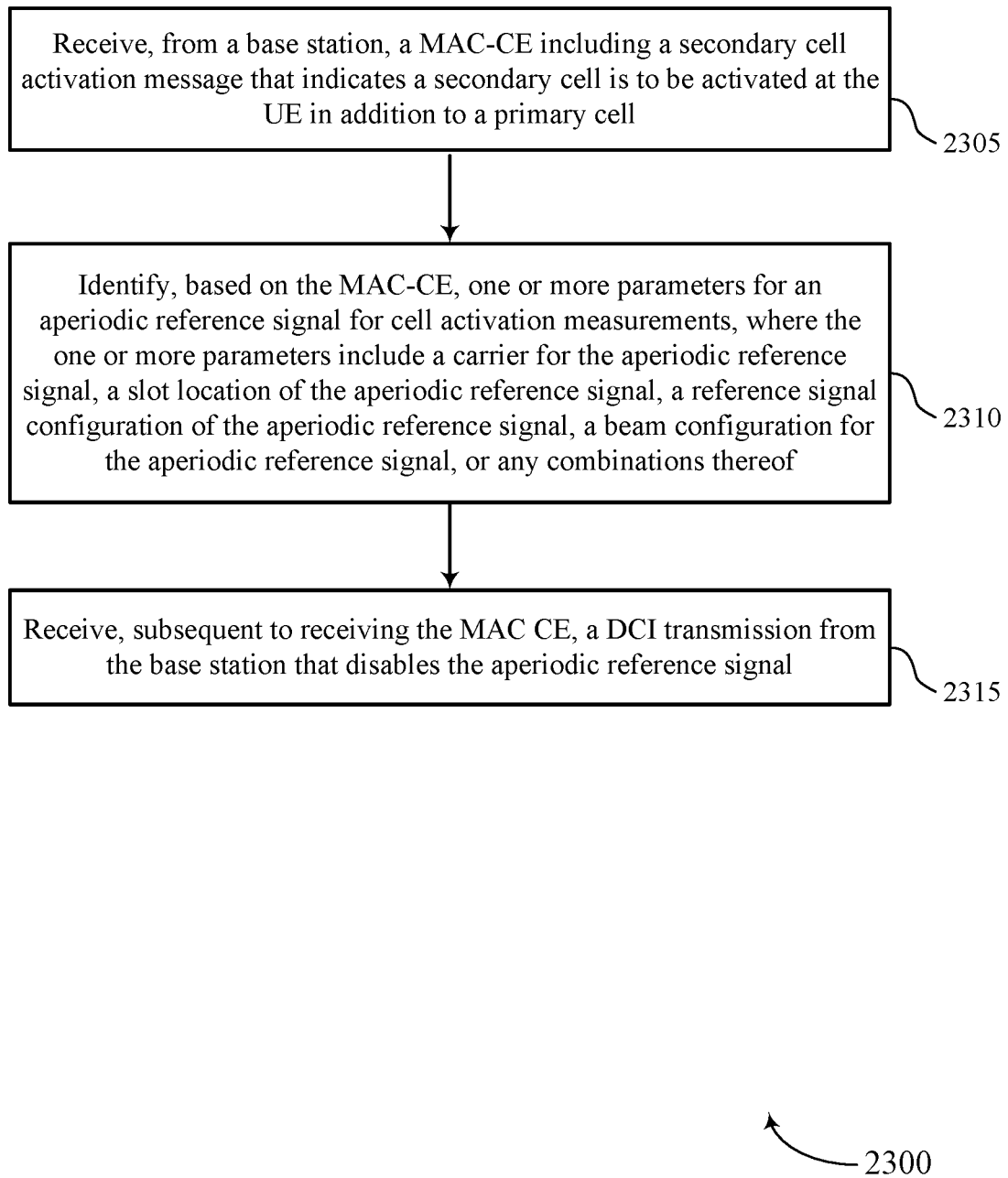

FIG. 23 shows a flowchart illustrating a method 2300 that supports reference signal configuration for SCell activation in accordance with aspects of the present disclosure. The operations of method 2300 may be implemented by a UE 115 or its components as described herein. For example, the operations of method 2300 may be performed by a communications manager as described with reference to FIGS. 11 through 14. In some examples, a UE may execute a set of instructions to control the functional elements of the UE to perform the functions described below. Additionally, or alternatively, a UE may perform aspects of the functions described below using special-purpose hardware.

At 2305, the UE may receive, from a base station, a MAC-CE including an SCell activation message that indicates a SCell is to be activated at the UE in addition to a primary cell. The operations of 2305 may be performed according to the methods described herein. In some examples, aspects of the operations of 2305 may be performed by a SCell activation manager as described with reference to FIGS. 11 through 14.

At 2310, the UE may identify, based on the MAC-CE, one or more parameters for an aperiodic reference signal for cell activation measurements, where the one or more parameters include a carrier for the aperiodic reference signal, a slot location of the aperiodic reference signal, a reference signal configuration of the aperiodic reference signal, a beam configuration for the aperiodic reference signal, or any combinations thereof. The operations of 2315 may be performed according to the methods described herein. In some examples, aspects of the operations of 2315 may be performed by a temporary reference signal manager as described with reference to FIGS. 11 through 14.

At 2315, the UE may receive, subsequent to receiving the MAC-CE, a DCI transmission from the base station that disables the aperiodic reference signal. The operations of 2320 may be performed according to the methods described herein. In some examples, aspects of the operations of 2320 may be performed by a SCell activation manager as described with reference to FIGS. 11 through 14.

Figure 24:
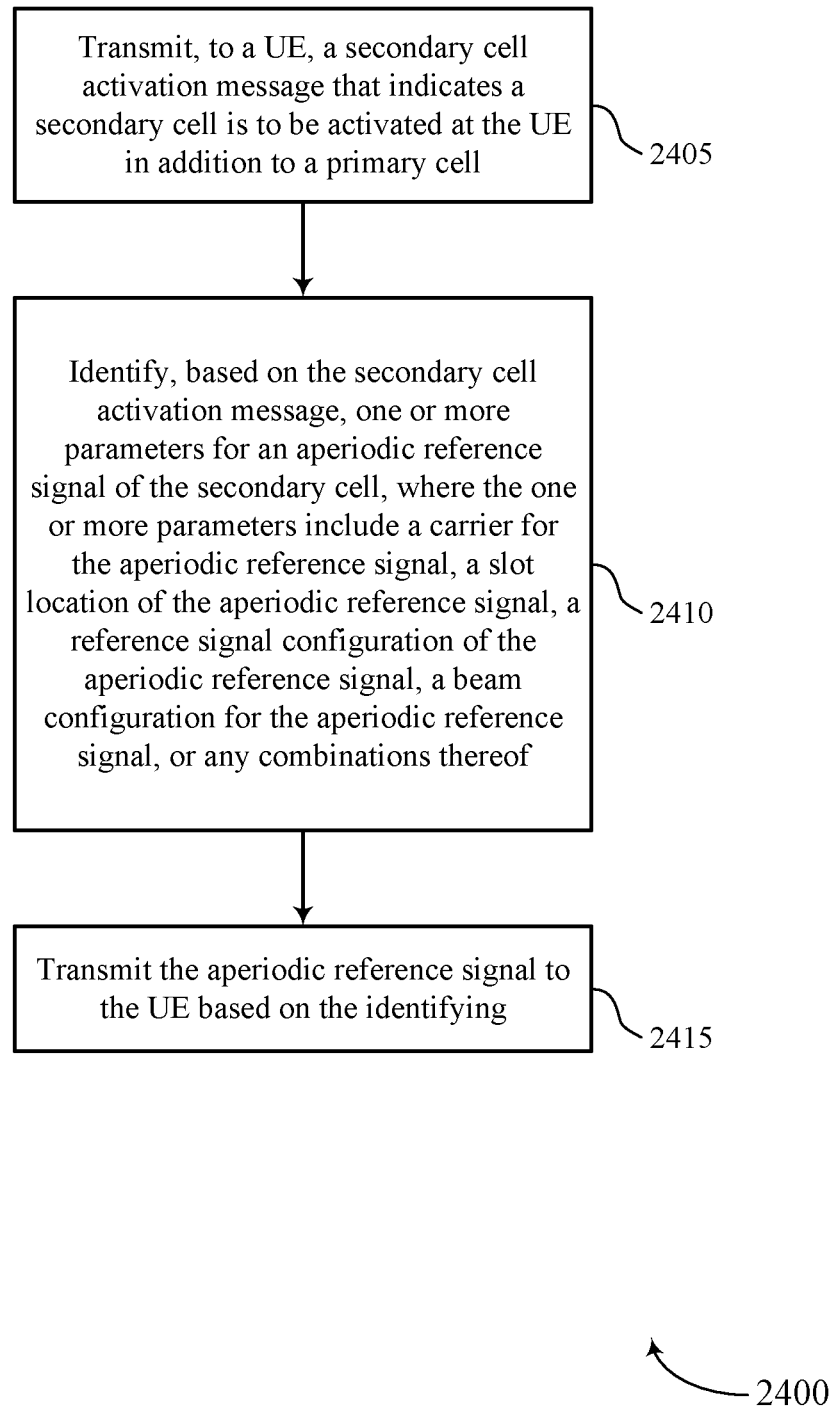

FIG. 24 shows a flowchart illustrating a method 2400 that supports reference signal configuration for SCell activation in accordance with aspects of the present disclosure. The operations of method 2400 may be implemented by a base station 105 or its components as described herein. For example, the operations of method 2400 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2405, the base station may transmit, to a UE, a SCell activation message that indicates a SCell is to be activated at the UE in addition to a primary cell. The operations of 2405 may be performed according to the methods described herein. In some examples, aspects of the operations of 2405 may be performed by a SCell activation manager as described with reference to FIGS. 15 through 18.

At 2410, the base station may identify, based on the SCell activation message, one or more parameters for an aperiodic reference signal of the SCell, where the one or more parameters include a carrier for the aperiodic reference signal, a slot location of the aperiodic reference signal, a reference signal configuration of the aperiodic reference signal, a beam configuration for the aperiodic reference signal, or any combinations thereof. The operations of 2410 may be performed according to the methods described herein. In some examples, aspects of the operations of 2410 may be performed by a temporary reference signal manager as described with reference to FIGS. 15 through 18.

At 2415, the base station may transmit the aperiodic reference signal to the UE based on the identifying. The operations of 2415 may be performed according to the methods described herein. In some examples, aspects of the operations of 2415 may be performed by a temporary reference signal manager as described with reference to FIGS. 15 through 18.

Figure 25:
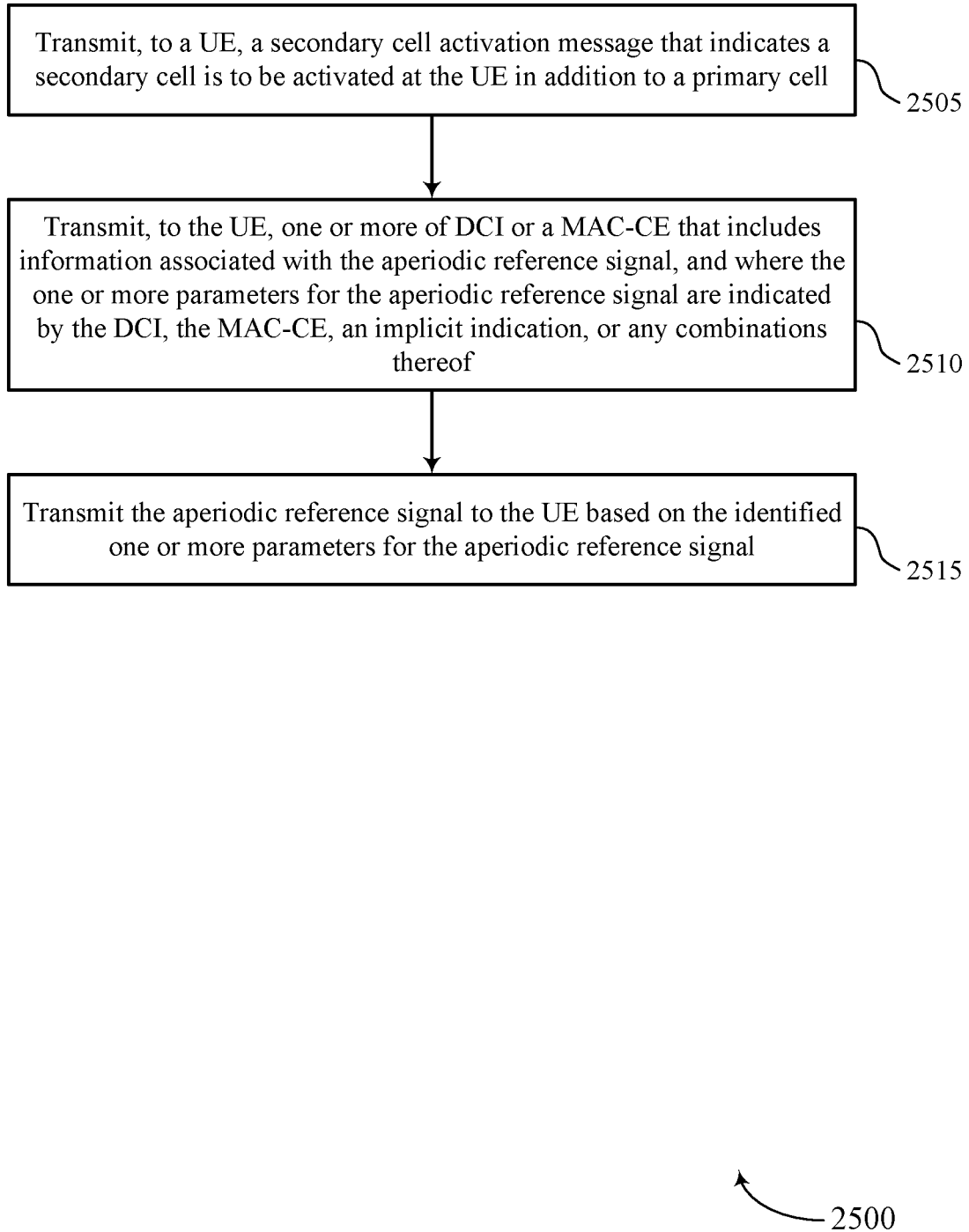

FIG. 25 shows a flowchart illustrating a method 2500 that supports reference signal configuration for SCell activation in accordance with aspects of the present disclosure. The operations of method 2500 may be implemented by a base station 105 or its components as described herein. For example, the operations of method 2500 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2505, the base station may transmit, to a UE, a SCell activation message that indicates a SCell is to be activated at the UE in addition to a primary cell. The operations of 2505 may be performed according to the methods described herein. In some examples, aspects of the operations of 2505 may be performed by a SCell activation manager as described with reference to FIGS. 15 through 18.

At 2510, the base station may transmit, to the UE, one or more of DCI or a MAC-CE that includes information associated with the aperiodic reference signal, and where the one or more parameters for the aperiodic reference signal are indicated by the DCI, the MAC-CE, an implicit indication, or any combinations thereof. The operations of 2510 may be performed according to the methods described herein. In some examples, aspects of the operations of 2510 may be performed by a temporary reference signal manager as described with reference to FIGS. 15 through 18.

At 2515, the base station may transmit the aperiodic reference signal to the UE based on the identified one or more parameters for the aperiodic reference signal. The operations of 2515 may be performed according to the methods described herein. In some examples, aspects of the operations of 2515 may be performed by a temporary reference signal manager as described with reference to FIGS. 15 through 18.

Figure 26:
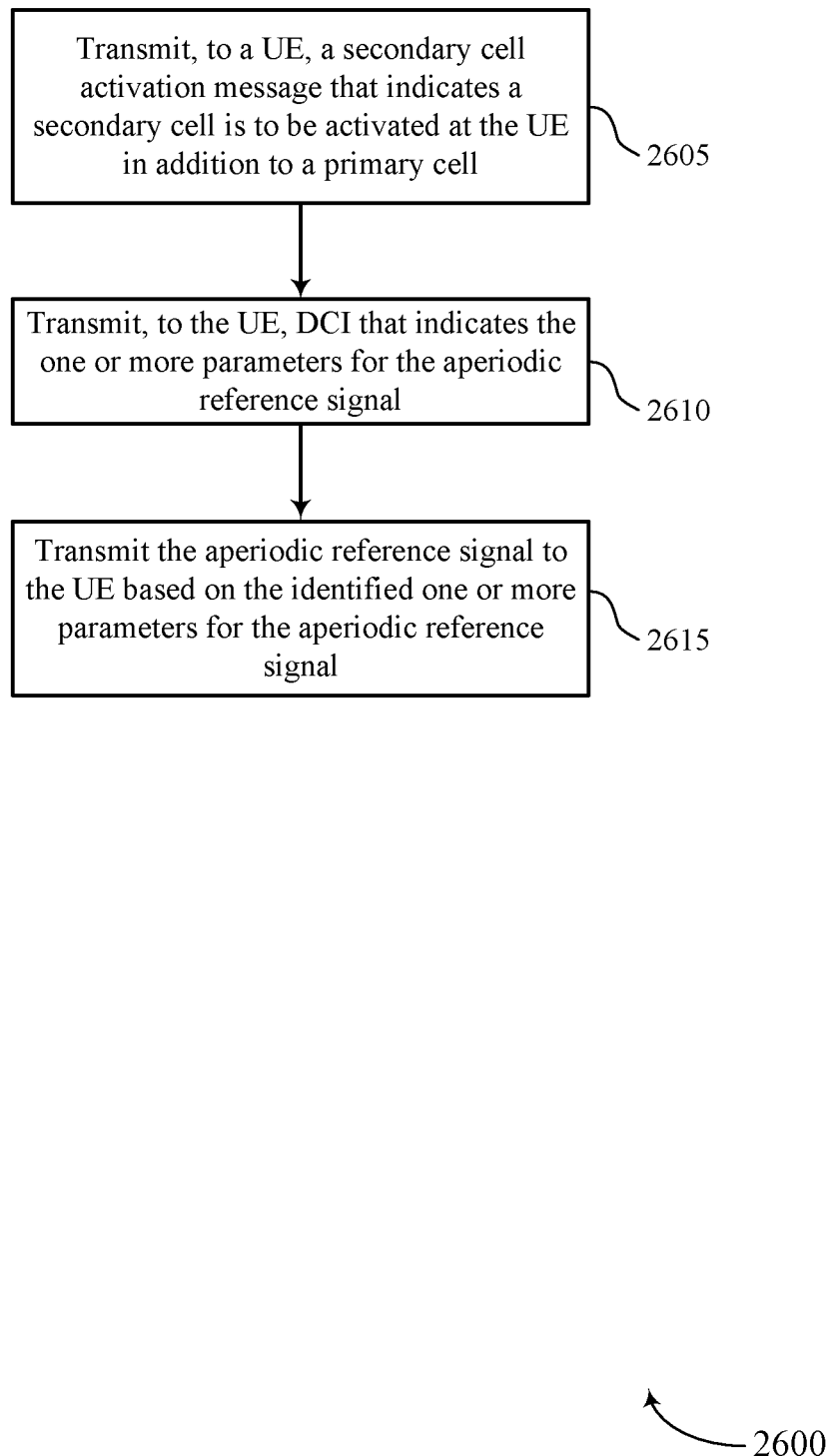

FIG. 26 shows a flowchart illustrating a method 2600 that supports reference signal configuration for SCell activation in accordance with aspects of the present disclosure. The operations of method 2600 may be implemented by a base station 105 or its components as described herein. For example, the operations of method 2600 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2605, the base station may transmit, to a UE, a SCell activation message that indicates a SCell is to be activated at the UE in addition to a primary cell. The operations of 2605 may be performed according to the methods described herein. In some examples, aspects of the operations of 2605 may be performed by a SCell activation manager as described with reference to FIGS. 15 through 18.

At 2610, the base station may transmit, to the UE, DCI that indicates one or more parameters for the aperiodic reference signal. The operations of 2610 may be performed according to the methods described herein. In some examples, aspects of the operations of 2610 may be performed by a configuration manager as described with reference to FIGS. 15 through 18. In some cases, the one or more parameters include a carrier for the aperiodic reference signal, a slot location of the aperiodic reference signal, a reference signal configuration of the aperiodic reference signal, a beam configuration for the aperiodic reference signal, or any combinations thereof.

At 2615, the base station may transmit the aperiodic reference signal to the UE based on the identified one or more parameters for the aperiodic reference signal. The operations of 2615 may be performed according to the methods described herein. In some examples, aspects of the operations of 2615 may be performed by a temporary reference signal manager as described with reference to FIGS. 15 through 18.

Figure 27:
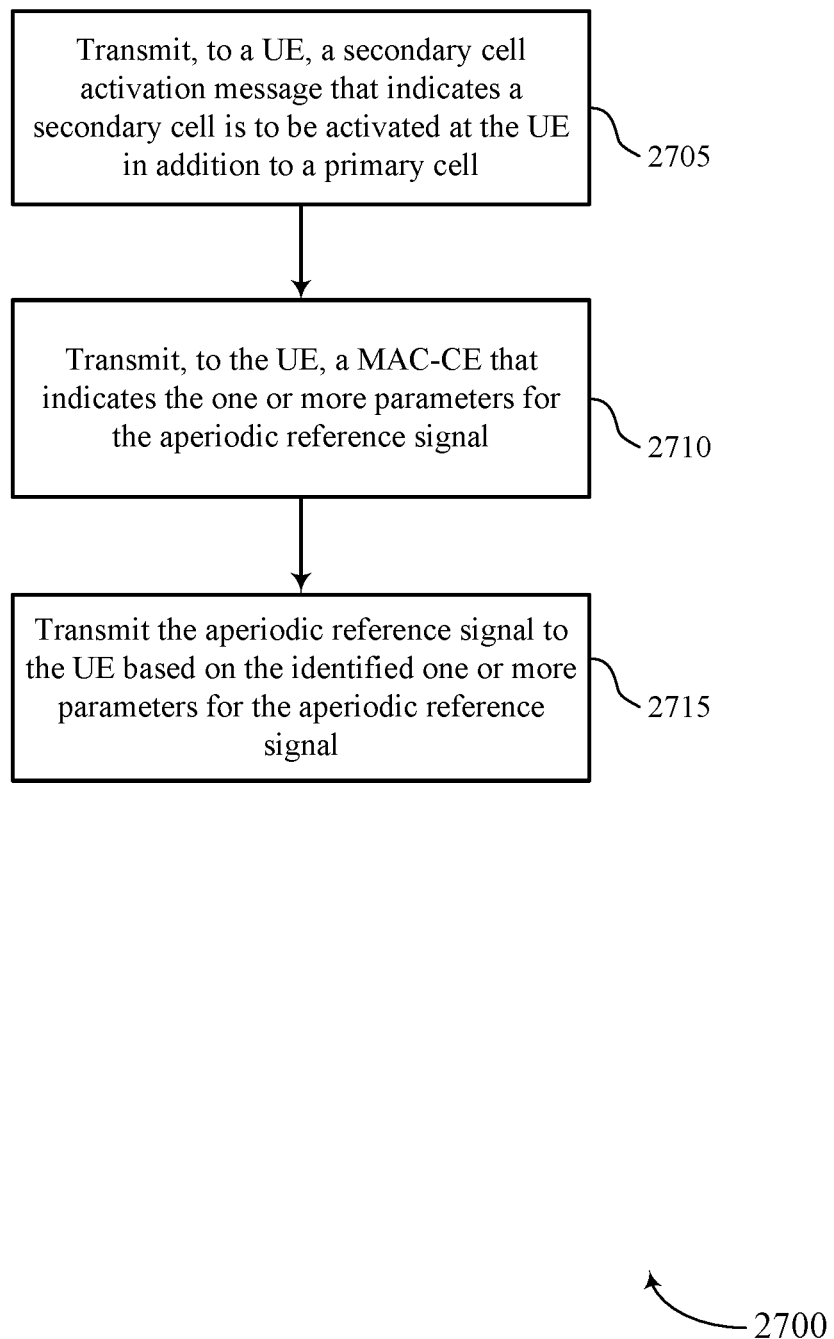

FIG. 27 shows a flowchart illustrating a method 2700 that supports reference signal configuration for SCell activation in accordance with aspects of the present disclosure. The operations of method 2700 may be implemented by a base station 105 or its components as described herein. For example, the operations of method 2700 may be performed by a communications manager as described with reference to FIGS. 15 through 18. In some examples, a base station may execute a set of instructions to control the functional elements of the base station to perform the functions described below. Additionally, or alternatively, a base station may perform aspects of the functions described below using special-purpose hardware.

At 2705, the base station may transmit, to a UE, a SCell activation message that indicates a SCell is to be activated at the UE in addition to a primary cell. The operations of 2705 may be performed according to the methods described herein. In some examples, aspects of the operations of 2705 may be performed by a SCell activation manager as described with reference to FIGS. 15 through 18.

At 2710, the base station may transmit, to the UE, a MAC-CE that indicates one or more parameters for the aperiodic reference signal. The operations of 2710 may be performed according to the methods described herein. In some examples, aspects of the operations of 2710 may be performed by a temporary reference signal manager as described with reference to FIGS. 15 through 18. In some cases, the one or more parameters include a carrier for the aperiodic reference signal, a slot location of the aperiodic reference signal, a reference signal configuration of the aperiodic reference signal, a beam configuration for the aperiodic reference signal, or any combinations thereof.

At 2715, the base station may transmit the aperiodic reference signal to the UE based on the identified one or more parameters for the aperiodic reference signal. The operations of 2715 may be performed according to the methods described herein. In some examples, aspects of the operations of 2715 may be performed by a temporary reference signal manager as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
one or more memories storing processor-executable code; and
one or more processors coupled with the one or more memories and individually or collectively configured to execute the code to cause the UE to:
receive, from a network device, a secondary cell activation message that indicates a secondary cell is to be activated at the UE in addition to a primary cell;
receive, based at least in part on the secondary cell activation message, a medium access control (MAC)-control element (CE) that indicates one or more parameters for an aperiodic reference signal for cell activation measurements, wherein a first field of the MAC-CE indicates a carrier for the aperiodic reference signal and a second field of the MAC-CE indicates a slot location of the aperiodic reference signal, a reference signal configuration of the aperiodic reference signal, a beam configuration for the aperiodic reference signal, or any combinations thereof; and
measure one or more characteristics of the secondary cell based at least in part on the aperiodic reference signal.

2. The apparatus of claim 1, wherein the MAC-CE is a first MAC-CE that indicates the one or more parameters for the aperiodic reference signal, wherein the first MAC-CE is different from a second MAC-CE that provides the secondary cell activation message.

3. The apparatus of claim 2, wherein the first MAC-CE and the second MAC-CE are in a same downlink shared channel communication, or are in different downlink shared channel communications, from the network device.

4. The apparatus of claim 1, wherein the first field of the MAC-CE indicates the secondary cell that is to be activated and the second field of the MAC-CE indicates the one or more parameters for the aperiodic reference signal for the secondary cell that is to be activated.

5. The apparatus of claim 1, wherein the aperiodic reference signal is enabled if a shared channel communication carrying the MAC-CE is scheduled by a preconfigured downlink control information (DCI) format.

6. The apparatus of claim 5, wherein the preconfigured DCI format is configured by radio resource control (RRC) signaling.

7. The apparatus of claim 1, wherein the aperiodic reference signal is enabled if a shared channel communication carrying the MAC-CE is scheduled by a downlink control information (DCI) transmission in a DCI search space set that is configured by radio resource control (RRC) signaling.

8. An apparatus for wireless communication at a network device, comprising:
one or more memories storing processor-executable code; and
one or more processors coupled with the one or more memories and individually or collectively configured to execute the code to cause the network device to:
transmit, to a user equipment (UE), a secondary cell activation message that indicates a secondary cell is to be activated at the UE in addition to a primary cell;
transmit, based at least in part on the secondary cell activation message, a medium access control (MAC)-control element (CE) that indicates one or more parameters for an aperiodic reference signal for cell activation measurements, wherein a first field of the MAC-CE indicates a carrier for the aperiodic reference signal and a second field of the MAC-CE indicates a slot location of the aperiodic reference signal, a reference signal configuration of the aperiodic reference signal, a beam configuration for the aperiodic reference signal, or any combinations thereof; and
transmit the aperiodic reference signal to the UE based at least in part on the transmission of the MAC-CE.

9. The apparatus of claim 8, wherein the MAC-CE is a first MAC-CE that indicates the one or more parameters for the aperiodic reference signal, wherein the first MAC-CE is different from a second MAC-CE that provides the secondary cell activation message.

10. The apparatus of claim 9, wherein the first MAC-CE and the second MAC-CE are in a same downlink shared channel communication, or are in different downlink shared channel communications, from the network device.

11. The apparatus of claim 8, wherein the first field of the MAC-CE indicates the secondary cell that is to be activated and the second field of the MAC-CE indicates the one or more parameters for the aperiodic reference signal for the secondary cell that is to be activated.

12. The apparatus of claim 8, wherein the aperiodic reference signal is enabled if a shared channel communication carrying the MAC-CE is scheduled by a preconfigured downlink control information (DCI) format.

13. The apparatus of claim 12, wherein the preconfigured DCI format is configured by radio resource control (RRC) signaling.

14. The apparatus of claim 8, wherein the aperiodic reference signal is enabled if a shared channel communication carrying the MAC-CE is scheduled by a downlink control information (DCI) transmission in a DCI search space set that is configured by radio resource control (RRC) signaling.

15. A method for wireless communication at a user equipment (UE), comprising:
receiving, from a network device, a secondary cell activation message that indicates a secondary cell is to be activated at the UE in addition to a primary cell;
receiving, based at least in part on the secondary cell activation message, a medium access control (MAC)-control element (CE) that indicates one or more parameters for an aperiodic reference signal for cell activation measurements, wherein a first field of the MAC-CE indicates a carrier for the aperiodic reference signal and a second field of the MAC-CE indicates a slot location of the aperiodic reference signal, a reference signal configuration of the aperiodic reference signal, a beam configuration for the aperiodic reference signal, or any combinations thereof; and
measuring one or more characteristics of the secondary cell based at least in part on the aperiodic reference signal.

16. A method for wireless communication at a network device, comprising:
transmitting, to a user equipment (UE), a secondary cell activation message that indicates a secondary cell is to be activated at the UE in addition to a primary cell;
transmitting, based at least in part on the secondary cell activation message, a medium access control (MAC)-control element (CE) that indicates one or more parameters for an aperiodic reference signal for cell activation measurements, wherein a first field of the MAC-CE indicates a carrier for the aperiodic reference signal and a second field of the MAC-CE indicates a slot location of the aperiodic reference signal, a reference signal configuration of the aperiodic reference signal, a beam configuration for the aperiodic reference signal, or any combinations thereof; and
transmitting the aperiodic reference signal to the UE based at least in part on the transmission of the MAC-CE.

* * * * *